US 8,353,011 B2

(12) United States Patent  (10) Patent No.: US 8,353,011 B2
Bajko et al.  (45) Date of Patent: Jan. 8, 2013

(54) APPARATUS, METHOD AND COMPUTER PROGRAM PRODUCT PROVIDING MOBILE NODE IDENTITIES IN CONJUNCTION WITH AUTHENTICATION PREFERENCES IN GENERIC BOOTSTRAPPING ARCHITECTURE (GBA)

(75) Inventors: Gabor Bajko, Solana Beach, CA (US); Tat Keung Chan, San Diego, CA (US)

(73) Assignee: Nokia Corporation, Espoo (FI)

( * ) Notice: Subject to any disclaimer, the term of this patent is extended or adjusted under 35 U.S.C. 154(b) by 1498 days.

(21) Appl. No.: 11/372,333

(22) Filed: Mar. 8, 2006

(65) Prior Publication Data

US 2006/0280305 A1  Dec. 14, 2006

Related U.S. Application Data

(63) Continuation-in-part of application No. 11/232,494, filed on Sep. 21, 2005.

(60) Provisional application No. 60/759,487, filed on Jan. 17, 2006, provisional application No. 60/692,855, filed on Jun. 21, 2005, provisional application No. 60/690,528, filed on Jun. 13, 2005.

(51) Int. Cl.
*H04L 29/06* (2006.01)

(52) U.S. Cl. ............................................. 726/4

(58) Field of Classification Search ................. 726/4
See application file for complete search history.

(56) References Cited

U.S. PATENT DOCUMENTS 8,087,069 B2  12/2011  Bajko et al. ........................ 726/4
2002/0026581 A1*  2/2002  Matsuyama et al. .......... 713/168
2002/0157007 A1  10/2002  Sashihara ..................... 713/183
2003/0028763 A1  2/2003  Malinen et al. ............... 713/155

(Continued)

FOREIGN PATENT DOCUMENTS

EP  1343342 A1  9/2003

(Continued)

OTHER PUBLICATIONS

"3rd Generation Partnership Project; Technical Specification Group Services and System Aspects; Generic Authentication Architecture (GAA); Generic Bootstrapping architecture (Release 7)", 3GPP TS 33.220 V7.2.0, (Dec. 2005), pp. 1-68.

(Continued)

*Primary Examiner* — Kim Vu
*Assistant Examiner* — John B King
(74) *Attorney, Agent, or Firm* — Harrington & Smith

(57) ABSTRACT

In one exemplary and non-limiting aspect thereof a method is provided that includes sending a wireless network (WN) a first message that includes a list of authentication mechanisms supported by a node and, in association with each authentication mechanism, a corresponding identity; determining in the WN an authentication mechanism to be used for bootstrapping, based at least on the list received from the node; and including information in a second message that is sent to the node, the information including the determined authentication mechanism in conjunction with a corresponding identity. The method further includes protecting at least the list of authentication mechanisms supported by the node and the corresponding identities and sending a second message to the network, the second message including at least the list of authentication mechanisms and the corresponding identities. The method further includes receiving a second response message from the network that is at least partially integrity protected, where the second response message includes an indication of the selected authentication mechanism and the corresponding identity.

40 Claims, 10 Drawing Sheets

U.S. PATENT DOCUMENTS

| | | | |
|---|---|---|---|
| 2003/0115142 A1* | 6/2003 | Brickell et al. | 705/51 |
| 2003/0166398 A1 | 9/2003 | Netanel | 455/410 |
| 2004/0028031 A1* | 2/2004 | Valin et al. | 370/352 |
| 2005/0009520 A1* | 1/2005 | Herrero et al. | 455/435.1 |
| 2005/0021957 A1 | 1/2005 | Gu | 713/170 |
| 2005/0094593 A1* | 5/2005 | Buckley | 370/328 |
| 2006/0005263 A1* | 1/2006 | Hardt | 726/28 |

FOREIGN PATENT DOCUMENTS

| | | |
|---|---|---|
| JP | 06-261033 | 9/1994 |
| JP | 10-242957 | 9/1998 |
| JP | 2003-157234 | 5/2003 |
| JP | 2004-021686 | 1/2004 |
| JP | 2004-040555 | 2/2004 |
| JP | 2004297759 A | 10/2004 |
| JP | 2005004769 A | 1/2005 |
| JP | 2005086656 A | 3/2005 |
| TW | 200307439 A | 1/2003 |
| TW | 200403000 A | 2/2004 |
| WO | WO-2004/112349 A1 | 12/2004 |
| WO | WO 2004/112349 A1 | 12/2005 |

OTHER PUBLICATIONS

Niemi, A. et al., "Hypertext Transfer Protocol (HTTP) Digest Authentication Using Authentication and Key Agreement (AKA)", RFC 3310, Sep. 2002, 13 pages.

Franks, J. et al., "HTTP Authentication: Basic and Digest Access Authentication", Jun. 1999, pp. 1-32.

"Wireless Local Area Network (WLAN) Interworking", $3^{rd}$ Generation Partnership Project 2 "3GPP2", TSG-X (PSN/PDS), X.P0028-0, 21 pages.

"$3^{rd}$ Generation Partnership Project; Technical Specification Group Services and System Aspects; Generic Authentication Architecture (GAA); Generic Bootstrapping architecture (Release 6)", 3GPP TS 33.220 V6.3.0, (Dec. 2004), pp. 1-36.

"$3^{rd}$ Generation Partnership Project 2; Generic Bootstrapping Architecture (GBA) Framework", 3GPP2 S.P0109-0 Version 0.6, Dec. 8, 2005, pp. 1-57.

Generic Bootstrapping Architecture (GBA) Framework 3GPP2 S.S0109 Version 1.0 Version Date Mar. 30, 2006, $3^{rd}$ Generation Partnership, Project 2 "3GPP2".

"Wireless Local Area Network (WLAN) Interworking", $3^{rd}$ Generation Partnership Project 2 "3GPP2", TSG-X (PSN), X.P0028-0, 45 pages.

"WPA™ Deployment Guidelines for Public Access Wi-Fi® Networks", Wi-Fi Alliance, Oct. 28, 2004, 3 pgs.

"HTTP Authentication, RFC 2617", Frank et al., Standards Track, Jun. 1999, pp. 4, 5, 7, 8, 9, 14, 15, 16.

"$3^{rd}$ Generation Partnership Project; Technical Specification Group Services and System Aspects; Generic Authentication Architecture (GAA); Generic bootstrapping architecture (Release 6)", 3GPP TS 33.220 V6.3.0, Dec. 2004, pp. 11, 18 and 19.

Vietnamese Office Action for corresponding VN patent Application No. 1-2008-00084 mailed on May 9, 2012.

* cited by examiner

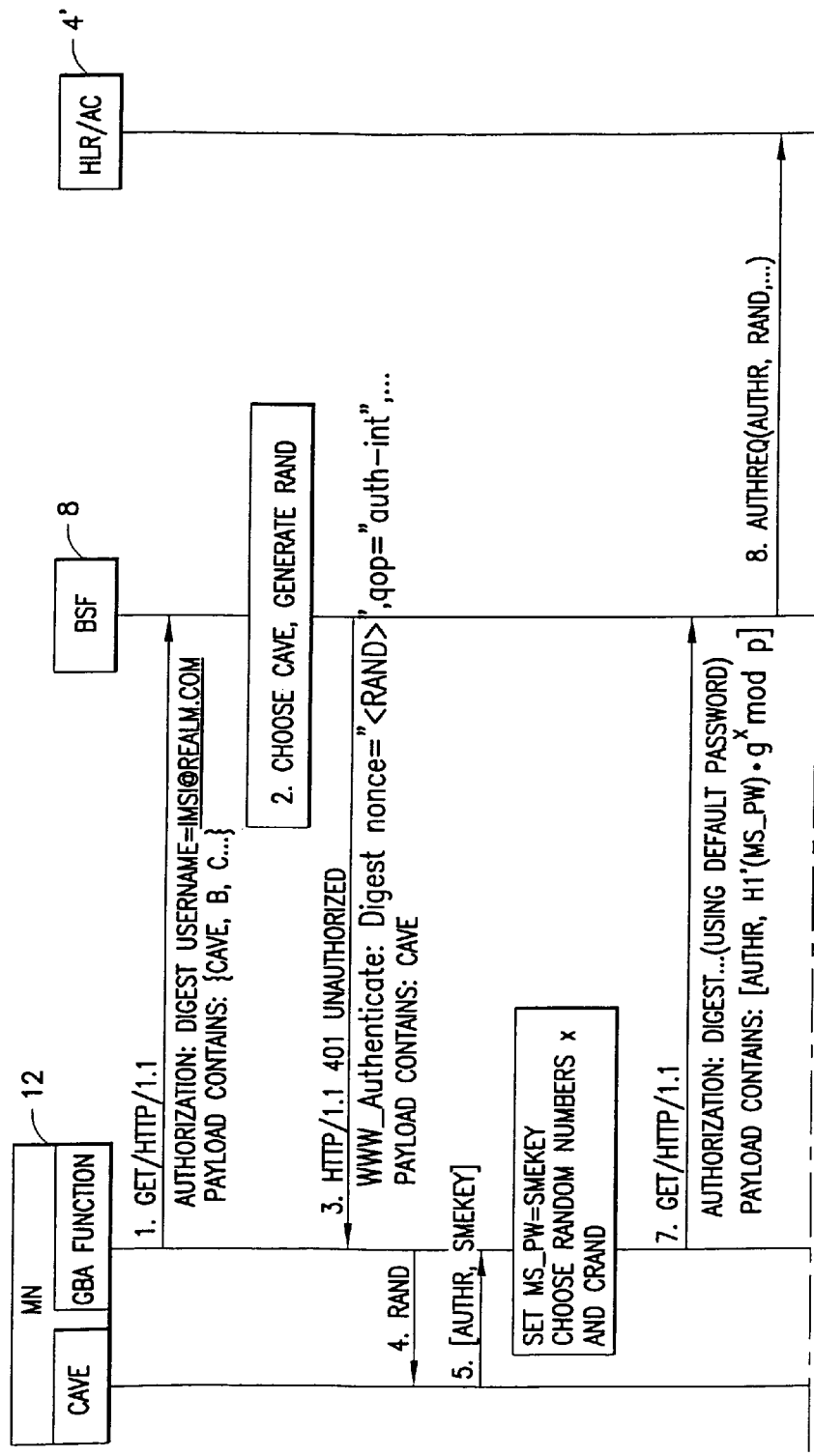

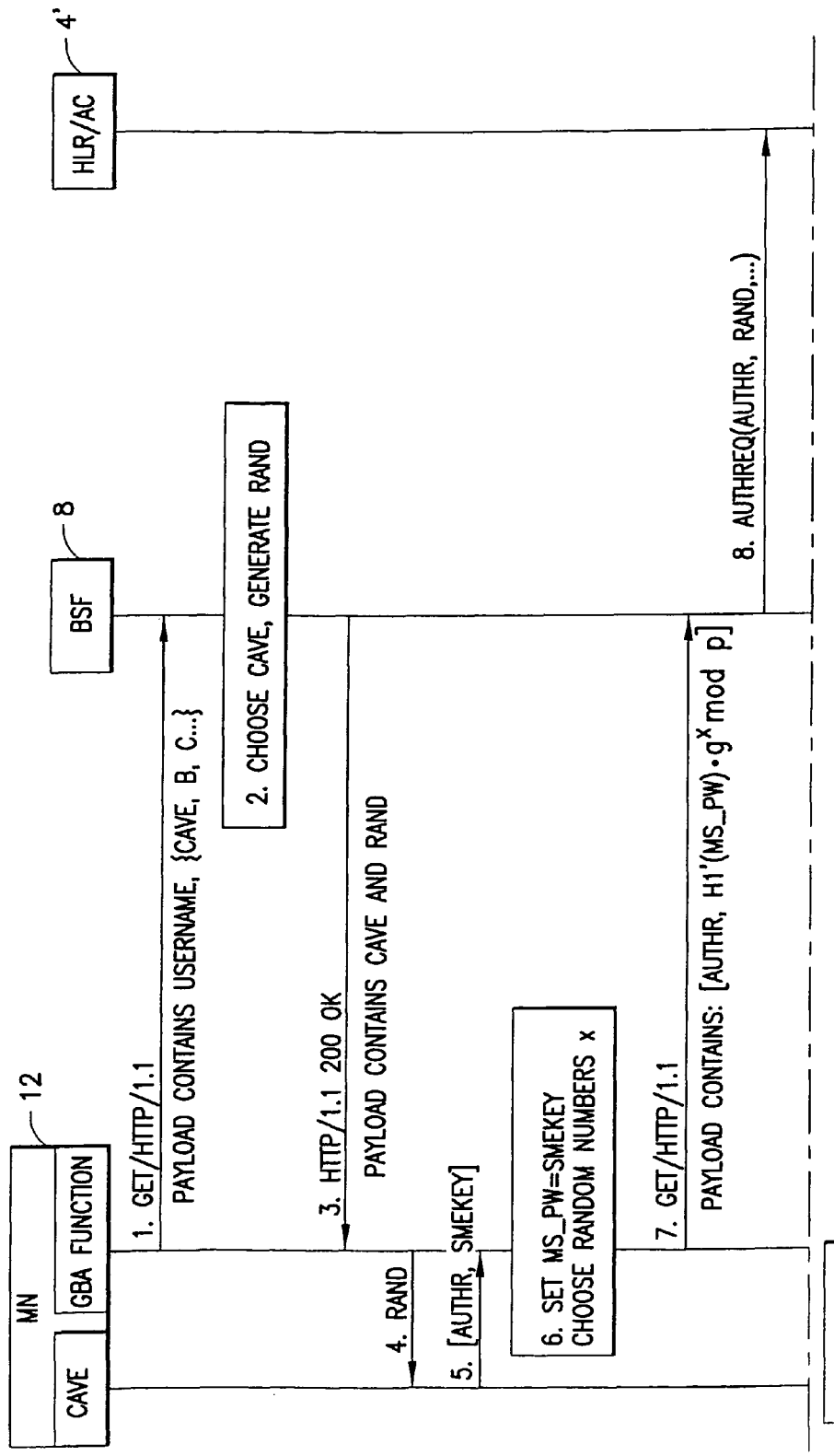

APPARATUS, METHOD AND COMPUTER PROGRAM PRODUCT PROVIDING MOBILE NODE IDENTITIES IN CONJUNCTION WITH AUTHENTICATION PREFERENCES IN GENERIC BOOTSTRAPPING ARCHITECTURE (GBA)

CLAIM OF PRIORITY FROM A COPENDING PROVISIONAL PATENT APPLICATION

This patent application claims priority under 35 U.S.C. §119(e) from U.S. Provisional Patent Application No. 60/759,487, filed Jan. 17, 2006, the disclosure of which is incorporated by reference herein in its entirety, including the Exhibits A, B, C and D that are appended thereto, and also claims priority from U.S. Provisional Patent Application No. 60/690,528, filed Jun. 13, 2005, and from U.S. Provisional Patent Application No. 60/692,855, filed Jun. 21, 2005, the disclosures of which are incorporated by reference herein in their entireties, including all Exhibits appended thereto.

CROSS-REFERENCE TO A RELATED PATENT APPLICATION

This patent application is a continuation-in-part of U.S. patent application Ser. No. 11/232,494, filed Sep. 21, 2005, entitled: "Method, Apparatus and Computer Program Product Providing Bootstrapping Mechanism Selection in Generic Bootstrapping Architecture (GBA)", by Gabor Bajko and Tat Keung Chan, the content of which is incorporated by reference herein in its entirety as if fully restated herein. U.S. patent application Ser. No. 11/232,494 claims priority under 35 U.S.C. §119(e) from U.S. Provisional Patent Application No. 60/690,528, filed Jun. 13, 2005, and from U.S. Provisional Patent Application No. 60/692,855, filed Jun. 21, 2005.

TECHNICAL FIELD

The exemplary and non-limiting embodiments of this invention relate generally to communication systems, methods and devices and, more specifically, relate to authentication and related techniques used in communication systems.

BACKGROUND

The following definitions are herewith defined:

| | |
|---|---|
| 3GPP | Third Generation Partnership Project |
| AAA | Authentication, Authorization and Accounting |
| GAA | Generic Authentication Architecture |
| GBA | Generic Bootstrapping Architecture |
| BSF | Bootstrapping Server Function |
| AKA | Authentication and Key Agreement |
| IM | IP Multimedia |
| ISIM | IM Services Identity Module |
| NAI | Network Access Identifier |
| MN | Mobile Node |
| UE | User Equipment |
| EV-DO | Evolution Data Only |

3GPP GBA (see 3GPP TS 33.220 "GAA:GBA", attached as Exhibit A to the above-referenced U.S. Provisional Patent Application No. 60/759,487) aims at specifying a mechanism to bootstrap authentication and key agreement for application security from the 3GPP AKA mechanism. GBA is also being introduced in 3GPP2, where apart from AKA, bootstrapping based on legacy key materials, including the SMEKEY (for CDMA1x systems) and MN-AAA Key (for CDMA1x EV-DO systems), are also being standardized. As a result, when operating in a 3GPP2 system a MN may support, or may be required to support, more than one authentication and bootstrapping mechanism. A technique is therefore needed for the MN and the network to agree on the algorithm set to be used in the bootstrapping. The same is required for future terminals that support both 3GPP and 3GPP2 networks, such that a 3GPP terminal may roam in a 3GPP2 network (and vice versa) and still use GBA. In addition, it is possible for operators to deploy both 3GPP and 3GPP2 networks in the same geographical location. In such cases, terminals also have to negotiate with the network the bootstrapping mechanism to use.

3GPP supports only one authentication and bootstrapping mechanism, i.e., the Digest-AKA mechanism and AKA protocol with 3GPP-defined algorithms. Usage of AKA with Digest authentication is specified in Digest-AKA (see IETF RFC 3310 "Digest AKA", attached as Exhibit B to the above-referenced U.S. Provisional Patent Application No. 60/759,487).

In 3GPP2 there are different mechanisms for bootstrapping supported in the network side, as both legacy and non-legacy terminals need to be supported.

The MN may have support for multiple authentication and key generation mechanisms (e.g. AKA, MN-AAA, CAVE) and may have multiple pre-provisioned secrets. In 3GPP2 there is a mechanism selection procedure defined, which mandates that the MN inserts into the payload of the first message it sends to the BSF the list of supported authentication mechanisms, enabling the BSF to select the authentication mechanism that it prefers. Once the BSF selects the authentication and key generation mechanism, it contacts the correct database and fetches authentication data. For instance, if the MN supports MN-AAA, in addition to other mechanisms, and the BSF selects MN-AAA, then the BSF will contact the H-AAA to fetch a challenge.

The MN has also one or more identities. For example, if the MN has an ISIM application, then it has a private identity. If the MN is an EV-DO terminal, then it has an NAI. If the MN is a 1x terminal, then it has an IMSI-like identity.

This creates a problem, in that when the MN first contacts the BSF by sending an HTTP GET request (according to 3GPP2 S.P0109-0, Version 0.6, 8 Dec. 2005, "Generic Bootstrapping Architecture (GBA) Framework", attached as Exhibit C to the above-referenced U.S. Provisional Patent Application No. 60/759,487), it is mandated to insert its identity into the request. Because most of the identities can only be used with specific authentication and key generation mechanisms (e.g., private identity can only be used with AKA, IMSI can only be used by CAVE, EV-DO NAI can only be used by MN-AAA), by selecting and including one of its identities into the GET request the MN pre-selects implicitly the authentication mechanism as well. With one specific identity already inserted, the BSF cannot make another choice for the mechanism than the one which that identity can be used with. Alternatively, a mapping of the different identities of a MN may need to be accessible by the BSF, but this approach may not be desirable for a number of reasons.

SUMMARY

In accordance with exemplary and non-limiting embodiments thereof this invention provides a method that includes receiving in a wireless network (WN) a first message that is comprised of a list of authentication mechanisms supported by a node and, in association with each authentication mechanism, a corresponding identity; determining in the WN an authentication mechanism to be used for bootstrapping, based at least on the list received from the node; and including information in a second message that is sent to the node, the information comprising the determined authentication mechanism in conjunction with a corresponding identity.

In accordance with exemplary and non-limiting embodiments thereof this invention further provides a computer program product embodied in a computer readable medium the execution of which by a data processor of a node comprises operations of sending a wireless network (WN) a first message that is comprised of a list of authentication mechanisms supported by the node and, in association with each authentication mechanism, a corresponding identity; and receiving a first response message from the WN, the first response message comprising information pertaining to an authentication mechanism selected by the WN from the list provided by the node in the first message in conjunction with a corresponding identity.

In accordance with exemplary and non-limiting embodiments thereof this invention further provides a device that includes a data processor coupled to a transmitter and to a receiver and operable to send to a network via the transmitter a first message that is comprised of a list of authentication mechanisms supported by the device and, in association with each authentication mechanism, a corresponding identity, and to receive from the network via the receiver a first response message, the first response message comprising information pertaining to an authentication mechanism selected by the network from the list in conjunction with a corresponding identity.

Further in accordance with exemplary and non-limiting embodiments thereof this invention provides a computer program product embodied in a computer readable medium the execution of which by a data processor of a wireless network element (WNE) comprises operations of receiving a first message from a node that is comprised of a list of authentication mechanisms supported by the node and, in association with each authentication mechanism, a corresponding identity; determining an authentication mechanism to be used for bootstrapping, based at least on the list received from the node; sending a first response message to the node, the first response message comprising information pertaining to the determined authentication mechanism and a corresponding identity; and receiving a second message from the node that is at least partially integrity protected, the second message comprising at least the list of authentication mechanisms that the node supports, and the corresponding identities, in an integrity protected form.

Further in accordance with exemplary and non-limiting embodiments thereof this invention provides a network device that includes a data processor coupled to a transmitter and to a receiver and operable to receive from a node, via the receiver, a first message that is comprised of a list of authentication mechanisms supported by the node and, in association with each authentication mechanism, a corresponding identity. The data processor is further operable to determine an authentication mechanism to be used for bootstrapping, based at least in part on the list received from the node, and to send a first response message to the node via the transmitter, the first response message comprising information pertaining to the determined authentication mechanism and a corresponding identity. The data processor is further operable to receive from the node a second message that is at least partially integrity protected, the second message comprising the list of authentication mechanisms that the node supports, and corresponding identities, in an integrity protected form.

Further in accordance with exemplary and non-limiting embodiments thereof this invention provides a device that includes means for sending to a network a first message that is comprised of a list of authentication mechanisms supported by the device and, in association with each authentication mechanism, a corresponding identity; and means for receiving from the network a first response message, the first response message comprising information descriptive of an authentication mechanism selected by the network from the list and a corresponding identity. The device further includes means for integrity protecting the list of authentication mechanisms supported by the device and for sending a second message to the network that is at least partially integrity protected, the second message comprising, in an integrity protected form, the list of authentication mechanisms that the device supports and, in association with each authentication mechanism, a corresponding identity.

Still further in accordance with exemplary and non-limiting embodiments thereof this invention provides a network device that includes means for receiving from a node a first message that is comprised of a list of authentication mechanisms supported by the node and, in association with each authentication mechanism, a corresponding identity, means for selecting an authentication mechanism to be used for bootstrapping, based at least in part on the list received from the node, and means for sending a first response message to the node, the first response message comprising information pertaining to the selected authentication mechanism and a corresponding identity. The receiving means is further operable for receiving from the node a second message that is at least partially integrity protected, the second message comprising the list of authentication mechanisms that the node supports and, in association with each authentication mechanism, the corresponding identity.

Still further in accordance with exemplary and non-limiting embodiments thereof this invention provides a system having a device coupled to a network device, where the device comprises a data processor coupled to a transmitter and to a receiver and being operable to send to the network device via the transmitter a first message that is comprised of a list of authentication mechanisms supported by the device and, in association with each authentication mechanism, a corresponding identity. The network device comprises a data processor coupled to a transmitter and to a receiver and is operable to select an authentication mechanism from the list. The device receives from the network device via the receiver a first response message, where the first response message comprises information pertaining to the authentication mechanism selected by the network device from the list and a corresponding identity. The device data processor is operable to at least partially integrity protect at least the list of authentication mechanisms supported by the device, and the corresponding identities, and to send via the transmitter a second message to the network device, the second message comprising the list of authentication mechanisms and corresponding identities.

Further still in accordance with exemplary and non-limiting embodiments thereof this invention provides a method that includes sending to a network a first message that is comprised of a list of authentication mechanisms supported by a device and, in association with each authentication mechanism, a corresponding identity; and receiving from the network a first response message, the first response message comprising information pertaining to an authentication mechanism selected by the network from the list in conjunction with a corresponding identity

DETAILED DESCRIPTION

Figure 1:
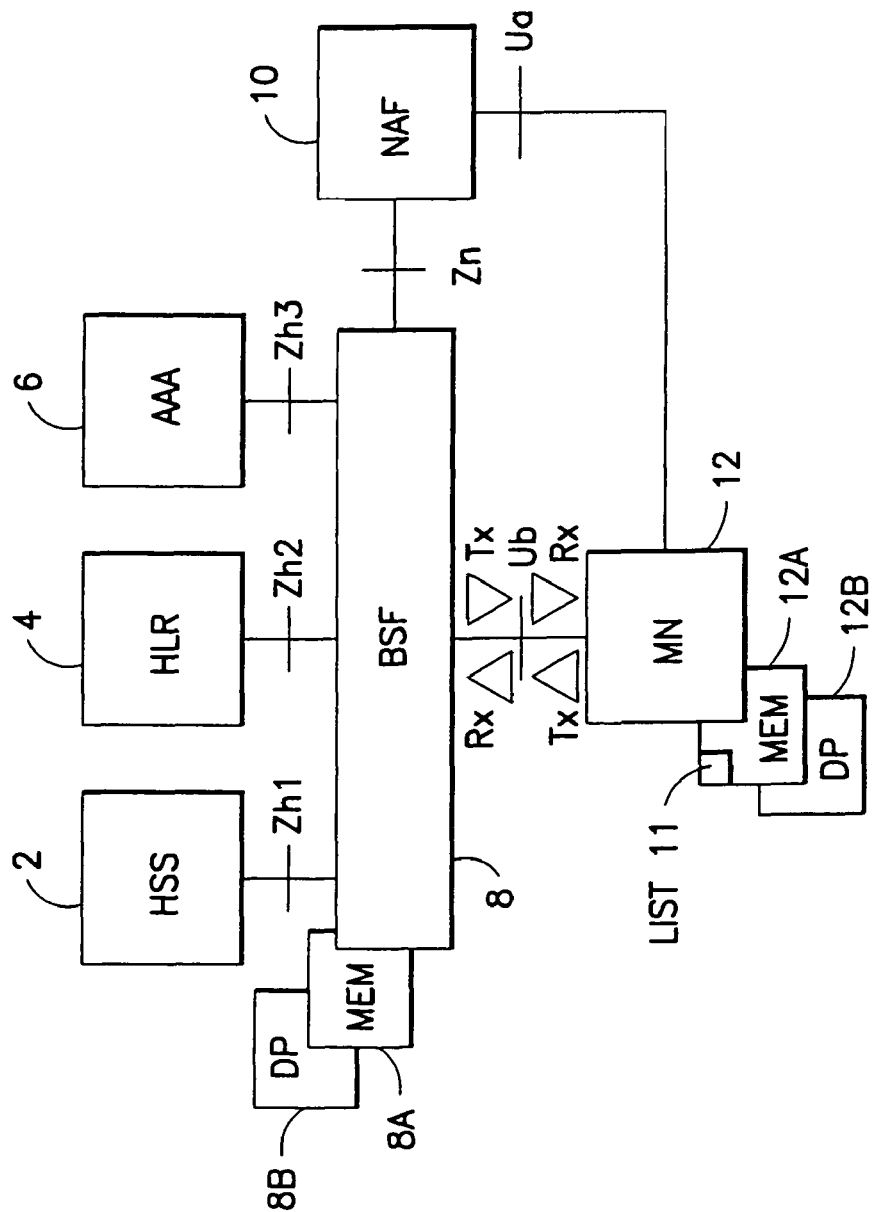
FIG. 1 is a block diagram that illustrates the 3GPP2 GBA reference network architecture.

The non-limiting and exemplary embodiments of this invention are directed generally to authentication, and more specifically are directed to the 3GPP Generic Bootstrapping Architecture (GBA), which has been defined in 3GPP and has also been introduced in 3 GPP2. FIG. 1 shows the general and non-limiting bootstrapping reference architecture. In FIG. 1 there is shown a Home Subscriber System (HSS) 2, a Home Location Register (HLR) 4, an Access, Authentication and Accounting (AAA) server 6, the BSF 8, a Network Application Function (NAF) 10 and the User Equipment/Mobile Node (MN) 12, as well as the interfaces between these components. It is assumed that suitable transmitters (Tx) and receivers (Rx) are used to covey information and messages between the MN 12, the BSF 8 and other network components. The non-limiting and exemplary embodiments of invention deal primarily with the procedures related to the Ub interface between the MN 12 and the BSF 8 where bootstrapping is performed. Note that a mobile terminal is referred to as User Equipment (UE) in 3GPP, and as a Mobile Node (MN) in 3GPP2. In this patent application these terms may be used interchangeably without a loss of generality, and they may also be referred to even more generally as a device or as a node.

The non-limiting and exemplary embodiments of this invention provide a mechanism to negotiate supported mechanisms/algorithms for bootstrapping between the MN 12 and the network.

The non-limiting and exemplary embodiments of this invention provide a solution for the MN 12 and the network element (BSF 8) to agree on an authentication and bootstrapping mechanism for use in GBA (3GPP2 environment), and also define how the mechanism can be integrated into the existing 3GPP procedures. It is assumed that the MN 12 possesses a list 11 of the authentication and bootstrapping mechanisms that it supports, such as by storing the list 11 in a memory (MEM) 12A coupled to a data processor (DP) 12B. The memory 12A is also assumed to include program code for operating the DP 12B in accordance with the various embodiments of this invention. It is further assumed that the BSF 8 also includes a memory (MEM) 8A coupled to a data processor (DP) 8B. The memory 8A is assumed to include program code for operating the DP 8B in accordance with the various embodiments of this invention.

In general, the various embodiments of the MN 12 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. In other embodiments the node may not include a transmitter and a receiver that is capable of wireless communications with a network via a wireless link, as wired connections may be used instead via a cable or wiring, including one or both of electrical and optical interconnections.

The memories 8A and 12A may be of any type suitable to the local technical environment and may be implemented using any suitable data storage technology, such as semiconductor-based memory devices, magnetic memory devices and systems, optical memory devices and systems, fixed memory and removable memory. The data processors 8B and 12B may be of any type suitable to the local technical environment, and may include one or more of general purpose computers, special purpose computers, microprocessors, digital signal processors (DSPs) and processors based on a multi-core processor architecture, as non-limiting examples.

In general, the exemplary embodiments of this invention may be implemented by computer software executable by a data processor of the MN 12, such as the DP 12B, or by hardware circuitry, or by a combination of software and hardware circuitry. The embodiments of this invention may also be implemented by computer software executable by a data processor of the BSF 8, such as the DP 8B, or by hardware circuitry, or by a combination of software and hardware circuitry.

Reference is first made to U.S. patent application Ser. No. 11/232,494, filed Sep. 21, 2005, entitled: "Method, Apparatus and Computer Program Product Providing Bootstrapping Mechanism Selection in Generic Bootstrapping Architecture (GBA)", by Gabor Bajko and Tat Keung Chan, the content of which is incorporated by reference herein in its entirety as if fully restated herein. U.S. patent application Ser. No. 11/232, 494 was attached as Exhibit D to the above-referenced U.S. Provisional Patent Application No. 60/759,487, and claims priority under 35 U.S.C. §119(e) from U.S. Provisional Patent Application No. 60/690,528, filed Jun. 13, 2005, and from U.S. Provisional Patent Application No. 60/692,855, filed Jun. 21, 2005 (referenced several times below), the disclosures of which are incorporated by reference herein in their entireties.

Before discussing further the exemplary embodiments of this invention, and in order to gain a fuller understanding thereof, a discussion is now provided of the subject matter disclosed in U.S. patent application Ser. No. 11/232,494. Reference is made below to FIGS. 2-7 in this regard.

In an exemplary embodiment the bootstrapping procedure, in accordance with the non-limiting embodiments disclosed in U.S. patent application Ser. No. 11/232,494, comprises the following steps, which are described in further detail below with regard to FIG. 2.

A. In an initial bootstrapping request, the MN 12 presents the list 11 of authentication mechanisms it supports to the BSF 8 in a request. The MN 12 also includes the user's identity.

B. The BSF 8 decides on the authentication mechanism to be used for bootstrapping, based on the list 11 received from the MN 12 and other information (including as non-limiting examples the mechanisms that the BSF 8 itself supports, and the user's profile retrieved based on the user's identity). The BSF 8 then proceeds with the selected authentication mechanism, which typically includes responding with an authentication challenge. The BSF 8 also includes in the response an indication of the authentication mechanism chosen.

C. The MN 12 sends a new HTTP request to the BSF 8 containing the response to the challenge generated based on the authentication mechanism selected. The message also includes the original list 11 of authentication mechanisms the MN 12 supports, only that this time it is integrity protected.

D. The BSF 8 verifies if the response to the challenge is correct, and considers the authentication of the MN successful in case the response corresponds to the expected response. If authentication is successful, and the list 11 received in step C is the same as that in step A, the BSF 8 responds to the MN with an HTTP successful response. The response message may also include an indication of the selected authentication mechanism, which is integrity protected.

E. The MN 12 receives the successful response and may verify that the authentication mechanism chosen is as indicated.

Since the first two messages (steps A and B) typically cannot be protected because the two parties have not authenticated each other, a MITM attacker may intercept message A and remove a strong authentication mechanism in the list, leaving only a weak authentication mechanism(s) in the list for the BSF 8 to choose from. This results in a "bid-down" attack, where the bootstrapping procedure is forced to be based on a weaker authentication mechanism even when stronger ones are supported by both parties (e.g., the BSF 8 and the MN 12). The procedure, in accordance with the non-limiting embodiments disclosed in U.S. patent application Ser. No. 11/232,494, eliminates these kinds of "bid-down" attacks by having the MN 12 repeat the list in an integrity protected form in step C, thereby allowing the BSF 8 to detect a MITM attack if the lists in steps A and C do not match.

Describing the various aspects of the non-limiting embodiments disclosed in U.S. patent application Ser. No. 11/232,494 now in greater detail, in 3GPP the Ub interface (between the MN 12 and the BSF 8) is based on the HTTP Digest authentication. The same mechanism has been adopted in 3GPP2. For instance, for 3GPP and 3GPP2 AKA, Digest-AKA is used, whereas for bootstrapping for CDMA1x and CDMA EV-DO systems, HTTP Digest authentication with password-protected Diffie-Hellman (based on SMEKEY and MN 12-AAA Key respectively) is used (see 3GPP2 contribution: "Bootstrapping procedures for CDMA 1x and CDMA 1x EV-DO Systems", 3GPP2 TSG-S WG4, Portland, May 2005). In other words, possible authentication and bootstrapping mechanisms may include at least the followings:

3GPP AKA (the algorithm is not specified, it is operator specific);
3GPP2 AKA (SHA-1 is the algorithm mandated);
Bootstrapping based on SMEKEY; and
Bootstrapping based on MN-AAA Key.

In the future, more authentication mechanisms may be available and can readily be included in the MN-BSF selection procedure.

To eliminate the need to standardize a digest variant for each and every authentication mechanism in IETF, it is preferred that the list of supported authentication mechanisms and the selected authentication mechanism are embedded in the payload of the HTTP messages, rather than carrying this information in the Digest authentication headers.

Figure 2:
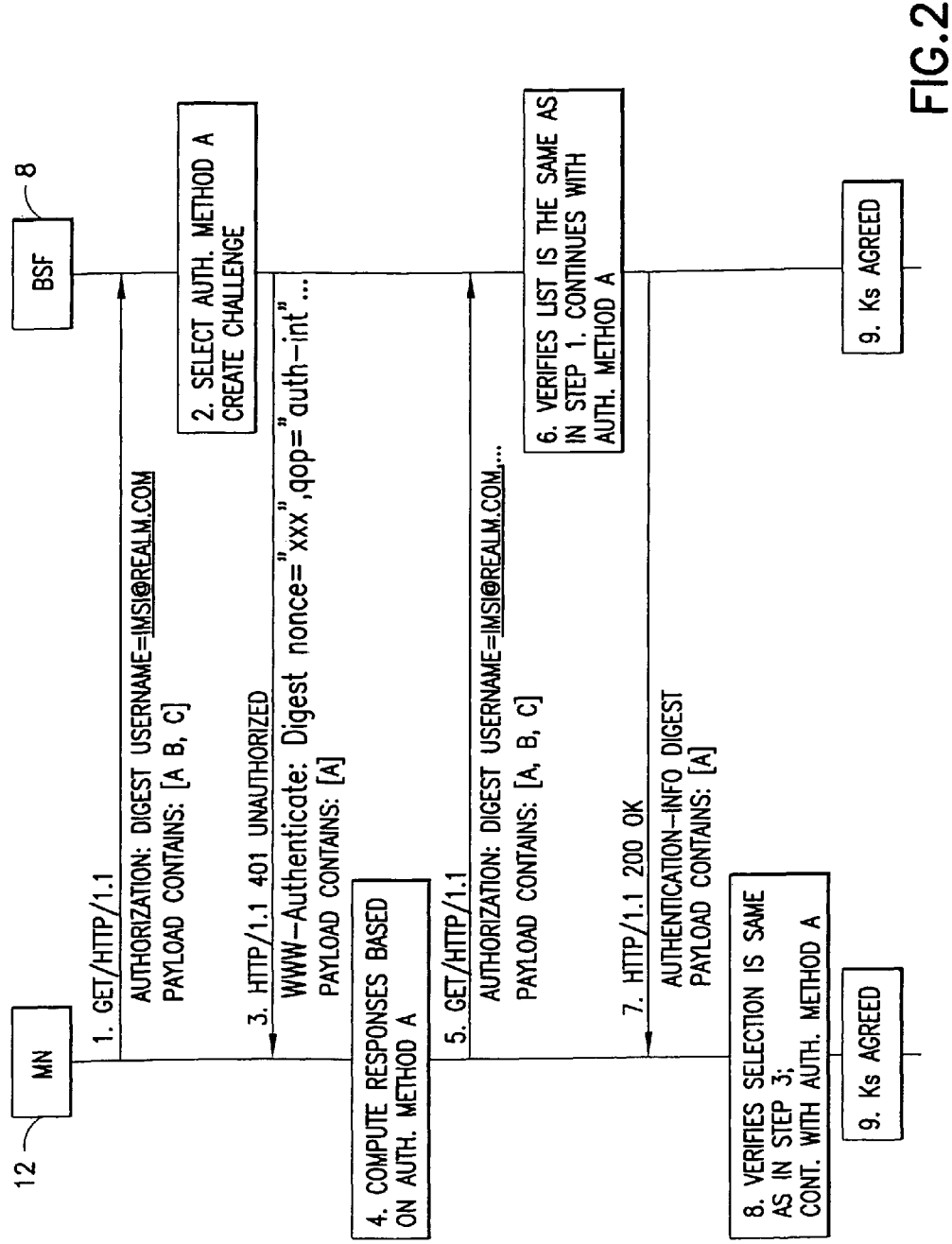
FIG. 2 illustrates a bootstrapping procedure with an authentication mechanism selection.

FIG. 2 shows the message sequence for a GBA bootstrapping procedure with authentication mechanism selection, and is explained in detail as follows:

1. The MN 12 sends an initial bootstrapping request in the form of an HTTP GET to the BSF 8. The MN 12 includes the user's identity in the Authorization header. Moreover, the list of supported authentication mechanisms (e.g. [A, B, C]) is included in the HTTP payload.

2. Upon receiving the bootstrapping request, the BSF 8 extracts the list of supported authentication mechanisms from the payload. Based on the extracted authentication mechanisms, the list of authentication mechanisms the BSF 8 itself supports, the user profile (retrieved based on the user's identity), and possibly other information, the BSF 8 decides on the authentication mechanism to use for bootstrapping.

3. The BSF 8 sends an HTTP 401 Unauthorized response to the MN 12. The response comprises the appropriate information based on the selected authentication mechanism. For example, if 3GPP AKA is selected, the WWW-Authenticate header contains AKA parameters in accordance with IETF RFC 3310 "Digest AKA". In addition, the payload will include an indication of the selected authentication mechanism (in this case, A). In addition, the quality of protection (qop) for Digest authentication is set to "auth-int", indicating that integrity protection of payload is required.

4. The MN 12 retrieves the selection of the BSF 8 from the payload and continues the authentication process according to the selection. Typically, this will comprise computing a response based on the challenge received and some shared secrets.

5. The MN 12 sends a new bootstrapping request in the form of HTTP GET to the BSF 8, with the computed response in accordance with the selected authentication mechanism. In addition, the payload comprises the original list of authentication mechanisms that the MN 12 supports. Since qop has been set to "auth-int", this original list is included in the computation of the Digest response and therefore is integrity protected.

6. The BSF 8 first verifies that the list presented in the payload matches that received in step 2. Only if a match is found does the BSF 8 continue with the authentication based on the selected mechanism. Typically, this comprises verifying the received digest response and computing a server-response for server-side authentication purpose.

7. The BSF 8 responds with an HTTP 200 OK message, indicating a successful authentication and bootstrapping operation. The message also includes the digest response computed by the BSF. The message may also include an indication of the selected authentication mechanism for reference by the MN 12. Similarly, this indication is integrity protected by setting qop to "auth-int".

8. The MN 12 may verify that the selected authentication mechanism is indeed the same as that indicated in step 3 It should be noted, that the mechanism works perfectly even without including the selected authentication mechanism into the HTTP 200 OK response.

9. Both the BSF 8 and the MN 12 derive the bootstrapping key based on the selected authentication and bootstrapping mechanism.

Figure 3:
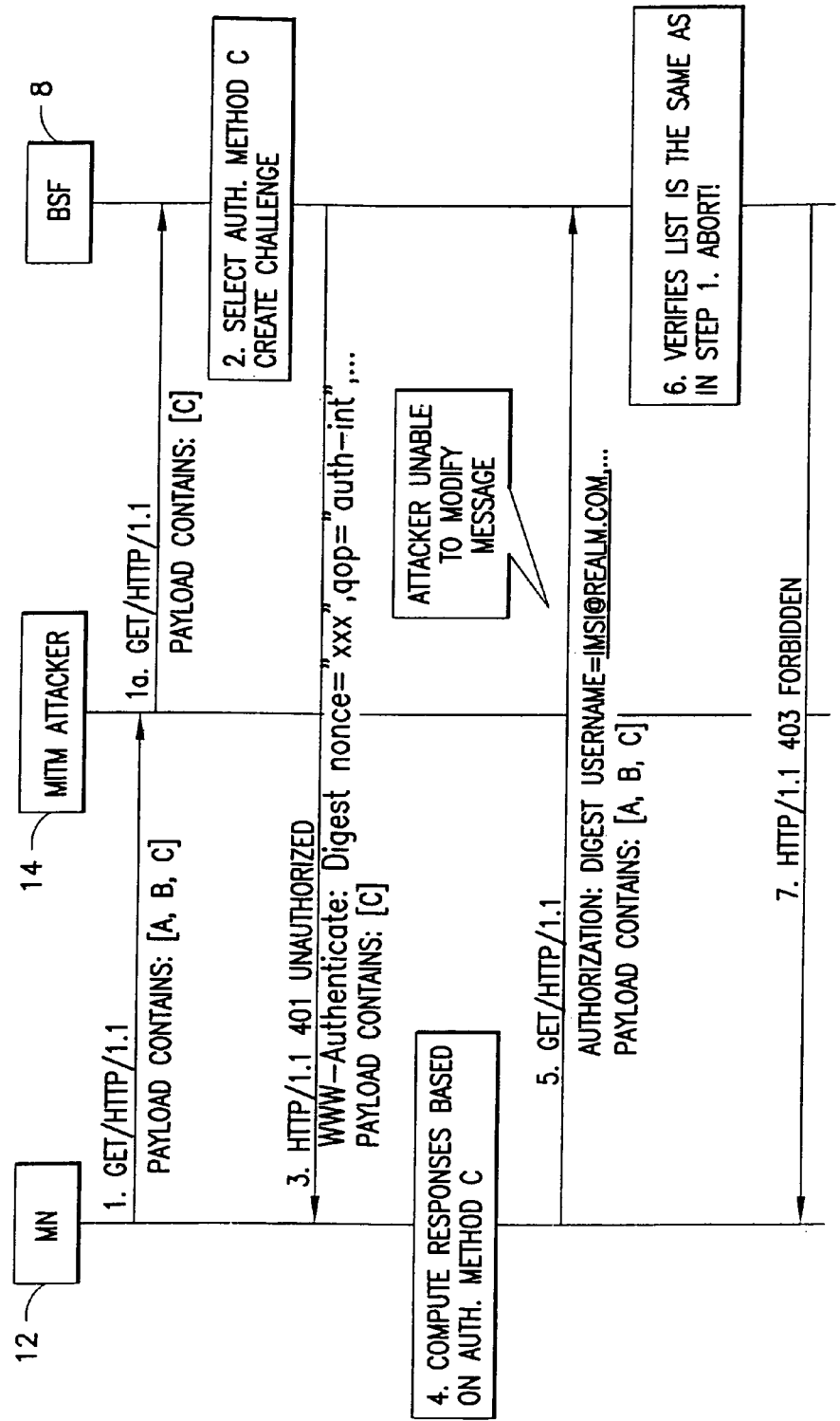
FIG. 3 is an example of an error scenario with a MITM attack.
Figure 4:
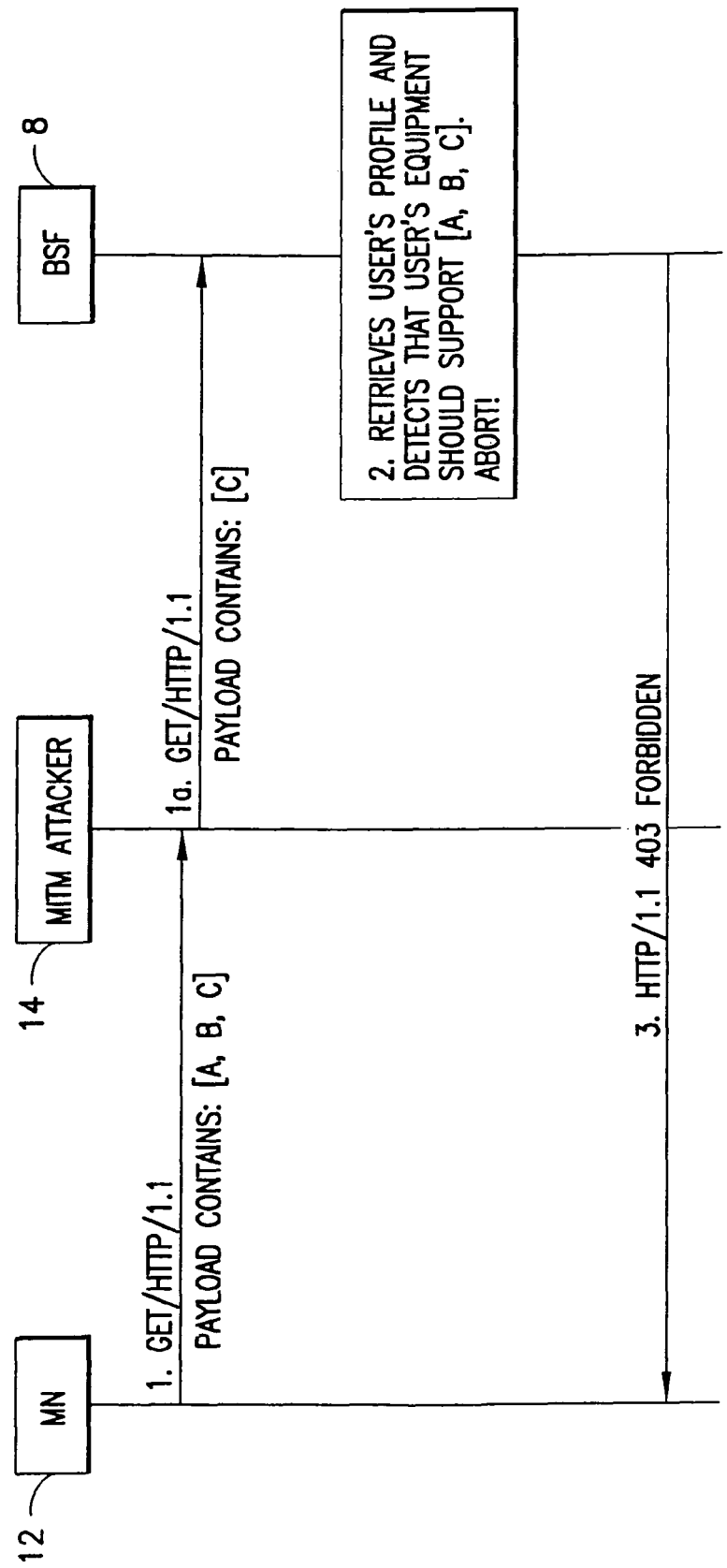
FIG. 4 is another example of an error scenario with a MITM attack.

FIG. 3 illustrates the scenario when a MITM attacker 14 attempts a bid-down attack as described above. The following explains each step in FIG. 3.

1. Same as step 1 as in FIG. 2. The original list 11 contains, by example, three supported mechanisms, namely, A, B and C.

1a. Message 1 is intercepted by the MITM attacker 14. The original list 11 is replaced with a list that contains only mechanism C, which may be the weakest of the three supported.

2. The BSF 8 extracts the list, which contains only mechanism C and therefore selects C and proceeds.

3. Same as step 3 in FIG. 2, with mechanism C indicated.

4. The MN 12 believes that BSF 8 has chosen mechanism C and therefore proceeds accordingly.

5. Same as step 6 in FIG. 2. Although MN 12 proceeds with mechanism C, it includes the original list of [A, B, C] in the payload, which is integrity protected, and therefore the MITM attacker 14 cannot make a modification to the message.

6. The BSF 8 while verifying the received list finds that it is not the same as the one received in step 2. It concludes that a bid-down attack has been launched and therefore aborts the bootstrapping procedure with a HTTP 403 Forbidden message.

Alternatively, the BSF 8 may detect this attack when the received list in step 2 does not match that as indicated in the user's profile, in which case it may also decide to abort the bootstrapping procedure. This is illustrated in steps 1, 2 and 3 of FIG. 4.

Figure 5:
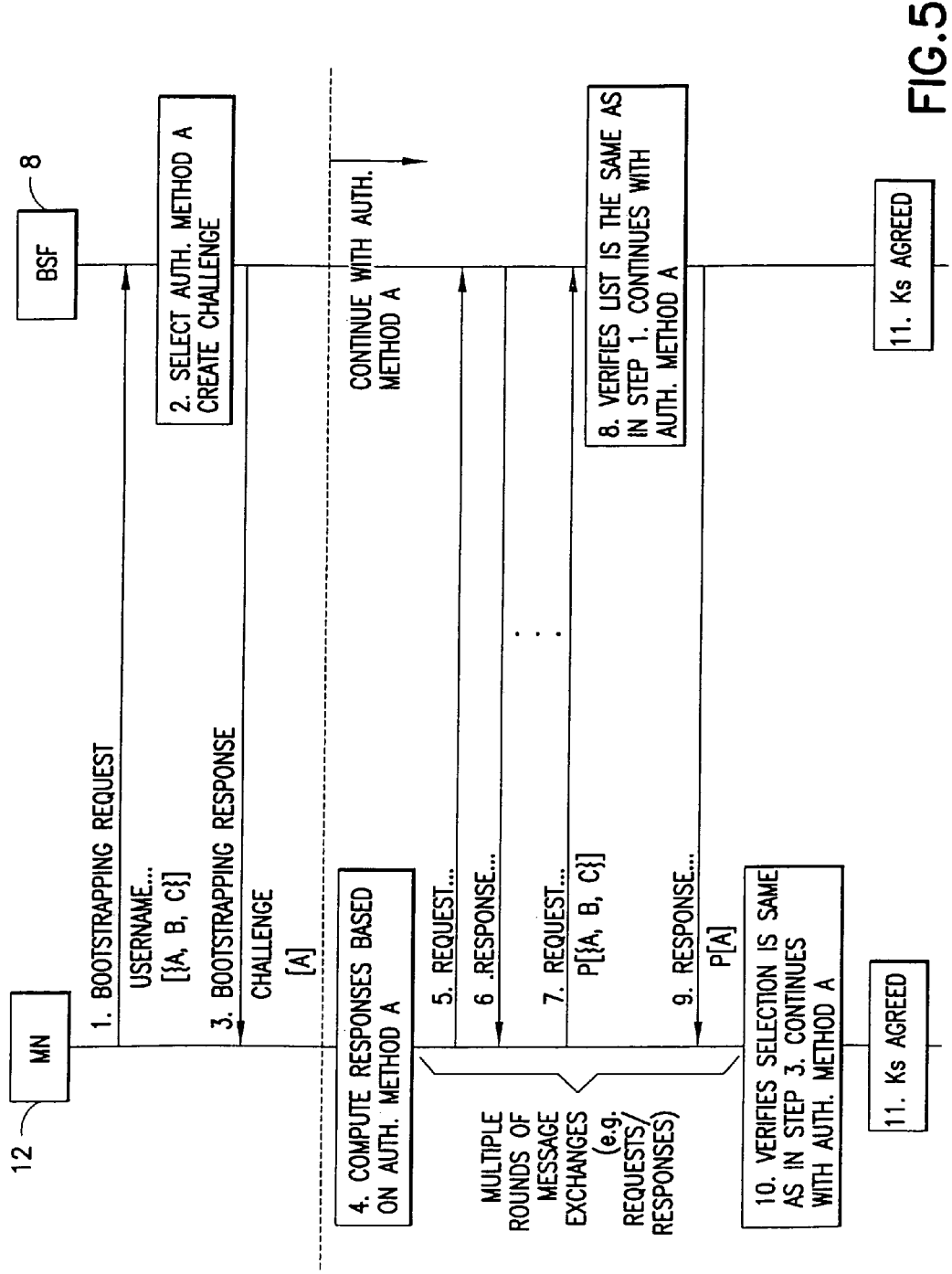
FIG. 5 shows an example of mechanism selection with bootstrapping that uses multiple rounds of message exchanges.

Further in accordance with the non-limiting embodiments disclosed in U.S. patent application Ser. No. 11/232,494, at least one pertains to those cases wherein the bootstrapping procedure for the selected authentication mechanism involves more than two rounds of requests/responses to complete. For example, bootstrapping based on Digest-AKA requires two rounds of request/response to complete. While the previous embodiment describes the cases where bootstrapping based on SMEKEY and MN-AAA Key can require two rounds of request/response as well, there may be cases where they require more than two rounds of request/response. In such cases, the non-limiting embodiments disclosed in U.S. patent application Ser. No. 11/232,494 still apply. This scenario is illustrated in FIG. 5 and is explained as follows:

1. In an initial bootstrapping request the MN 12 presents a list of authentication mechanisms it supports (e.g. {A, B, C}) to the BSF 8 in a request. The MN 12 also includes the user's identity. It may be assumed that in most cases this list is not protected.

2. The BSF 8 decides on the authentication mechanism to be used for bootstrapping, based on the list received from the MN 12 and other information (including the mechanisms that the BSF 8 itself supports, and the user's profile retrieved based on the user's identity). FIG. 5 assumes as a non-limiting example that mechanism A is chosen.

3. The BSF 8 then proceeds with the chosen authentication mechanism, which typically includes responding with an authentication challenge. The BSF 8 also includes in the response an indication of the authentication mechanism chosen (mechanism A in this example). Again, this indication may not be protected.

It should be noted that from this point on the MN 12 and BSF 8 continue with the selected mechanism (e.g. mechanism A as illustrated in FIG. 5). As was noted above, different mechanisms may require different numbers of rounds of message exchanges (e.g. requests/responses) to complete the bootstrapping procedure. For example, the Digest-AKA mechanism requires one more request/response after step 3 to complete; whereas for bootstrapping based on CAVE and the MN-AAA key, additional rounds may be required. In accordance with the exemplary embodiments of this invention, in one of these subsequent messages the MN 12 sends the original list 11 (as sent in message 1) again, but it is protected (e.g. integrity protected); while the BSF 8 may send the chosen mechanism (as sent in message 3) again, but it is protected (e.g. integrity protected). Note that while the MN 12 sends the original list 11 again protected, it is optional (but preferable) for the BSF 8 to send the chosen mechanism again protected. If such parameters are sent again protected, the other party is enabled to verify that the parameter sent is the same as the original parameter received, so as to detect any attempt by a MITM attacker to change the original parameters, which have been sent unprotected. In the following description, integrity protection is employed as an exemplary technique to protect the parameters. It should be understood that the parameters may as well be encrypted.

4. Still referring to FIG. 5, at step 4 the MN 12 computes the responses according to mechanism A.

5-6. There may be multiple rounds of requests/responses between the MN 12 and the BSF 8 as explained. In some of these rounds, the chosen mechanism may not be able to provide the required integrity protection. Therefore the MN 12 and BSF 8 may not be able to send the parameters integrity protected.

7. At some certain point of the bootstrapping procedure, the MN 12 may be able to send a message that includes data that is integrity protected. For example, in message 7 assume that the MN 12 is able to send such a message. If so, the MN 12 will include the original list 11 (the list {A, B, C} in the example) that is integrity protected, indicated by P[{A, B, C}] in FIG. 5.

8. Receiving the message, the BSF 8 verifies that the integrity protected list is the same as the list originally sent by the MN 12 in message 1. If not the BSF 8 may send an error response to the MN 12 to abort the operation (not shown). Alternatively, the BSF 8 may silently abort the operation.

9. At certain point of the bootstrapping procedure, the BSF 8 may be able to send a message that includes data that is integrity protected. For example, in message 9, assume that the BSF 8 is able to send such a message. The BSF may include the chosen mechanism (mechanism A in the example) that is integrity protected, indicated by P[A] in FIG. 5.

10. Receiving the message, the MN 12 verifies that the integrity protected chosen mechanism is the same as the one originally sent by the BSF 8 in message 2. If not, the MN 12 may send an error message to the BSF 8 to abort the operation (not shown). Alternatively, the MN 12 may silently abort the operation.

11. If successful, both parties are enabled to derive the bootstrapping key Ks according to the selected bootstrapping mechanism.

It can be noted that steps 7 and 8, and steps 9 and 10 (if present) need not be in the order as described, and that they need not be in consecutive messages. That is, the BSF 8 may send a message with the integrity protected parameter (the chosen mechanism) first, and the MN 12 may send a message with the integrity protected parameter (the list of supported mechanisms) at a later time. In addition, there may be more rounds of messages before and after the integrity protected messages are sent.

The following description provides exemplary implementations, in accordance with the non-limiting embodiments disclosed in U.S. patent application Ser. No. 11/232,494, using HTTP digest authentication (FIG. 6) and plain HTTP transport (FIG. 7). It should be noted that the exemplary and non-limiting embodiments disclosed in U.S. patent application Ser. No. 11/232,494 are not limited by these two examples, and may be implemented using other transport/authentication mechanisms as well (e.g., the Extensible Authentication Protocol (EAP)). In the following descriptions, the parameters needed for mechanism negotiation (the list 11 of supported mechanisms, sent by the MN 12, and the chosen mechanism, sent by the BSF 8) are assumed to be sent in the payloads of the HTTP messages. Note, however, that these parameters may alternatively be carried in appropriate headers in the HTTP messages.

HTTP Digest Authentication

In this exemplary implementation, HTTP digest authentication with password protected Diffie-Hellman is used for bootstrapping. A default password (e.g. "11 . . . 1") may be used as the digest password, so mutual authentication between the MN 12 and BSF 8 is actually based on the password protected Diffie-Hellman mechanism, using MS_AUTH and/or BS_AUTH. The details of the password protected Diffie-Hellman mechanism is based on WKEY (Wireless LAN Key) generation procedures described in the Wireless LAN interworking specification, which is being specified in 3GPP2 (See Section 7.1.1 of the 3GPP2 X.P0028 "Wireless LAN interworking", attached as Exhibit D to U.S. Provisional Patent Application No. 60/692,855, filed Jun. 21, 2005).

Figure 6B:
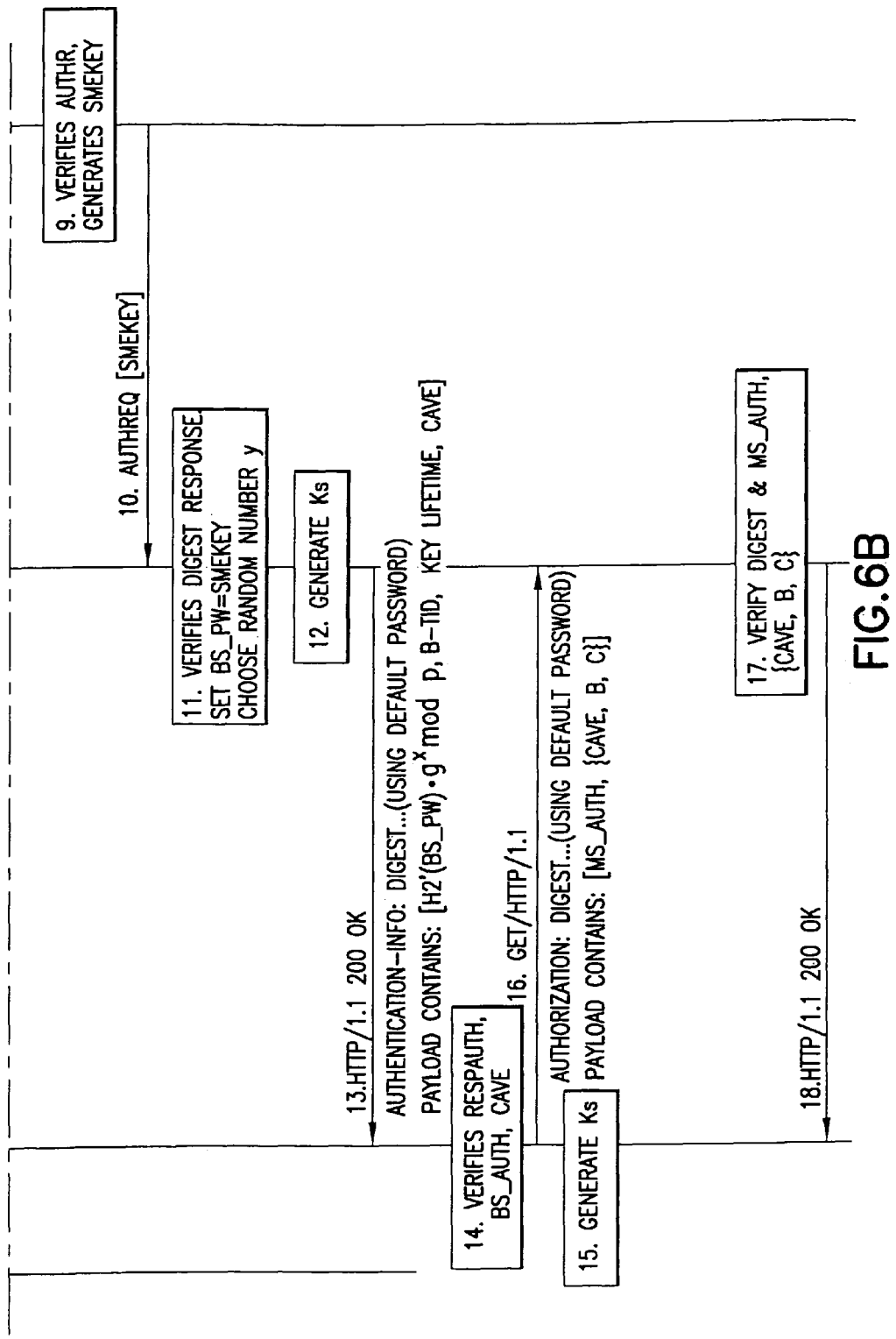
FIG. 6 shows a non-limiting example of negotiation using HTTP digest authentication.
Figure 7B:
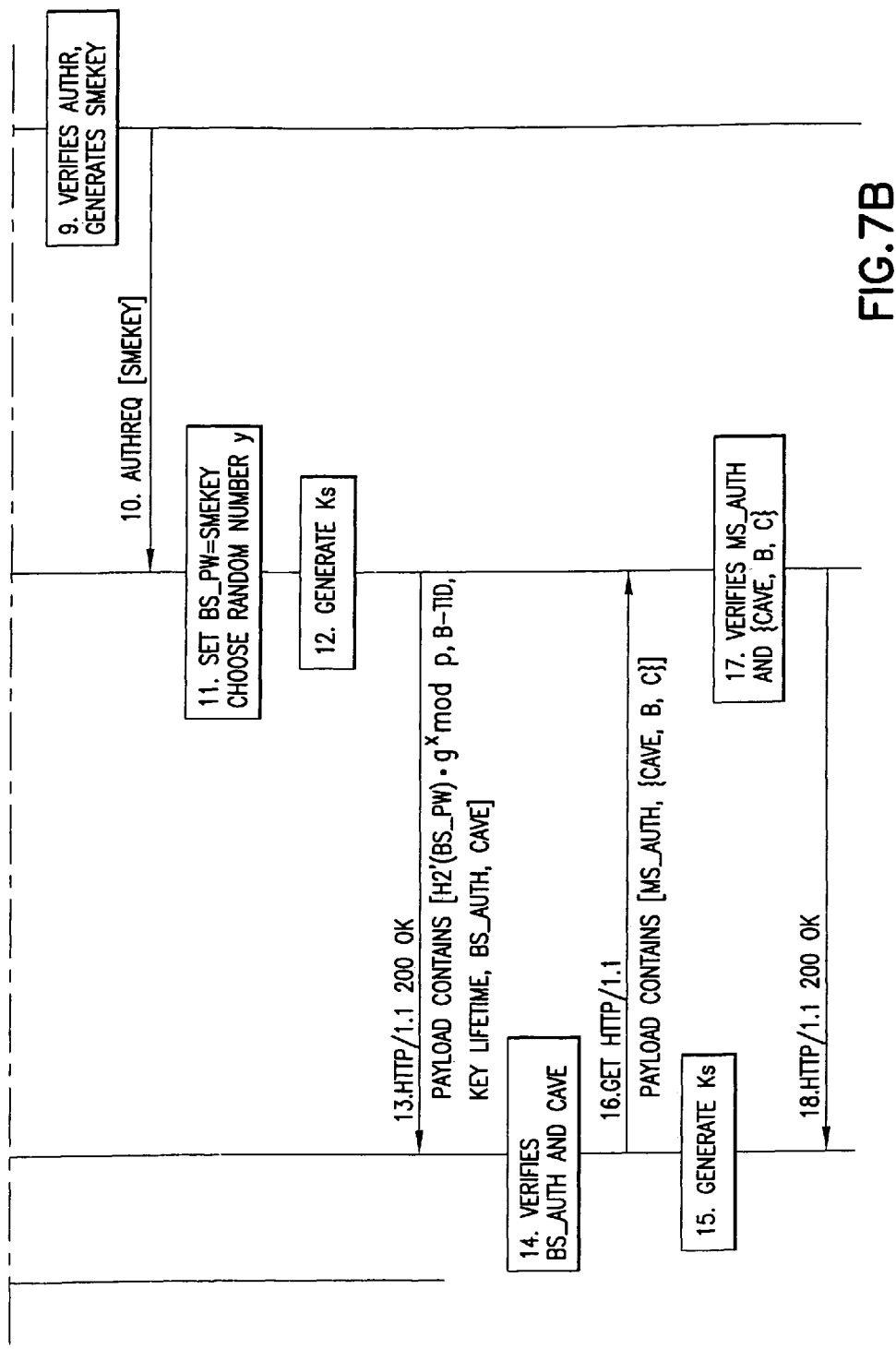
FIG. 7 shows a non-limiting example of negotiation using plain HTTP transport.

FIG. 6 illustrates one exemplary implementation of bootstrapping mechanism negotiation with the chosen mechanism being CAVE, where the bootstrapping procedure with CAVE requires three rounds of HTTP request/response altogether. The scenario for bootstrapping based on MN-AAA Key is very similar, and therefore is not described in further detail.

The following describes the steps shown in FIG. 6 in more detail.

1. The MN 12 sends a HTTP GET request towards the BSF 8. The user's identity, in the form of "IMSI@realm.com", is included as the username in the Authorization header. In addition, the user sends the list 11 of supported bootstrapping/authentication mechanisms in the payload (e.g. {CAVE, B, C}, meaning that the MN 12 supports CAVE and two other mechanisms, B and C).
2. The BSF 8 retrieves the list of supported mechanisms from the payload and makes a decision based on the list, the username, the user profile, and/or other information, and the BSF 8 selects CAVE as the bootstrapping mechanism in this non-limiting example. From this point on the bootstrapping is based on the chosen mechanism, which is CAVE. The BSF 8 generates a 32-bit RAND challenge value.
3. The BSF 8 sends a HTTP 401 response to the MN 12. The RAND is base64-encoded and carried in the nonce field of the WWW-Authenticate header. The field "qop-options" is set to "auth-int". The payload also contains an indication that CAVE is the chosen mechanism.
4. The MN 12 extracts the chosen mechanism from the payload and proceeds accordingly. For CAVE, the RAND challenge value received by the GBA Function is sent to the R-UIM or the 1X terminal as a simulated Global Challenge.
5. The 1X terminal (or the R-UIM) responds to the global challenge with an AUTHR and the SMEKEY. The AUTHR and the SMEKEY are then delivered to the GBA Function.
6. The GBA Function sets MS_PW to be the SMEKEY. It also generates a secret random number "x" for the Diffie-Hellman method. For the Digest authentication, the GBA Function also generates a 32-bit random number, CRAND, to be used as a client nonce.
7. The MN 12 sends another HTTP GET request to the BSF 8 with an appropriate Authorization header. The Digest response is assumed to be computed in accordance to RFC2617 (attached as Exhibit C to U.S. Provisional Patent Application No. 60/692,855, filed Jun. 21, 2005) using the default password. The CRAND is base64-encoded and carried in the cnonce field. The HTTP payload contains the AUTHR and the MS_RESULT, i.e., $g^x$ mod p covered by the hash of the SMEKEY with MS_PW=SMEKEY).
8. The BSF 8 verifies that the received MS_RESULT is not zero. The BSF 8, acting as a VLR, sends an AUTHREQ to the HLR/AC 4'. The AUTHREQ includes the RAND, SYSACCTYPE=GAA access and AUTHR parameters. The ESN parameter is set to all zeros. The SYSCAP parameter is set to indicate that Authentication parameters were requested on this system access (bit-A=1) and that Signaling Message Encryption is supported by the system (bit-B=1). All other bits of the SYSCAP parameter are preferably set to zero.
9. The HLR/AC 4' verifies the AUTHR and generates the SMEKEY.
10. The HLR/AC 4' responds with a TIA-41 AUTHREQ that includes the SMEKEY parameter. If authentication fails, the AUTHREQ will only include an access deny indication.
11. The BSF 8 authenticates the MN 12 by verifying the Digest response using the default password. If successful, the BSF 8 sets BS_PW=SMEKEY and generates a random secret number "y" for the Diffie-Hellman method.
12. The BSF 8 generates the 128-bit Ks. The B-TID value is also generated in the format of NAI by taking the base64 encoded RAND value from step 2, and the BSF 8 server name, i.e. base64encode(RAND)@BSF_servers_domain_name.
13. The BSF 8 sends a 200 OK response to the MN 12. The server digest response, "rspauth", is calculated according to RFC 2617 (Exhibit C to U.S. Provisional Patent Application No. 60/692,855, filed Jun. 21, 2005) using the default password and carried in the Authentication-Info header. The payload of the 200 OK response also contains the BS_RESULT, i.e. $g^y$ mod p, covered by the hash of SMEKEY, the B-TID, the lifetime of the key Ks, an indication of the chosen mechanism (CAVE) and BS_AUTH. Note that integrity protection can be provided by including the data in the computation of BS_AUTH. One exemplary way is as follows:

BS_AUTH[data]=SHA-1(0x00000005|0x00000C80+sizeof (data)|BS_PARAM|data|BS_PARAM|data) modulo $2^{128}$, where data is the information that needs to be integrity protected, and in this case includes the B-TID, key lifetime, and the indication of the chosen mechanism (CAVE).

14. The MN 12 verifies rspauth according to RFC 2617 (Exhibit C to U.S. Provisional Patent Application No. 60/692,855, filed Jun. 21, 2005) using the default password, and verifies that BS_AUTH equals XBS_AUTH' (using the same calculation as BS_AUTH). The MN 12 also verifies that the indicated chosen mechanism is CAVE. If successful, the server and the message sent are authenticated. If not successful, the MN 12 aborts the bootstrapping procedure and may retry immediately or at a later time.

15. The MN 12 generates the 128-bit Ks.
16. The MN 12 sends another HTTP GET request to BSF 8 with an appropriate Authorization header. The digest response is computed using the default password. The payload contains the original list of supported mechanisms ({CAVE, B, C} in this example) and MS_AUTH. Integrity protection can be provided by including the data that needs to be protected in the computation of MS_AUTH. One exemplary way is as follows:

MS_AUTH[data]=SHA-1(0x00000004|0x00000C80+sizeof(data)|MS_PARAM|data|MS_PARAM|data) modulo $2^{128}$, where data is the information that needs to be integrity protected, which in this case is the original list of supported mechanisms ({CAVE, B, C}).

17. The BSF 8 verifies the digest response using the default password and authenticates the MN 12 by verifying that the MS_AUTH equals XMS_AUTH (same calculation as MS_AUTH). The BSF 8 also verifies that the list of supported mechanisms is the same as the list received in step 2. If not, the BSF 8 may send a HTTP 403 Forbidden response, or other error responses to the MN 12, or silently abort the bootstrapping procedure (not shown).
18. If successful, the BSF 8 sends a 200 OK response to the MN 12.

Note that there are many possible variations in the above procedure. However, the basic concepts in accordance with the exemplary and non-limiting embodiments disclosed in U.S. patent application Ser. No. 11/232,494 remain the same and, therefore, not all possible variations are described. One variation is that MS_AUTH and BS_AUTH are used as the digest password in steps 16 and 17 respectively, in which case the "data" may not be included in the calculation of MS_AUTH and BS_AUTH. Integrity protection in that case will be provided by the digest authentication mechanism. Yet another variation is that instead of using MS_AUTH on MN 12 side and BS_AUTH in BSF 8 side, only MS_AUTH or BS_AUTH will be used in both sides. Again, the "data" is not included in the computation of MS_AUTH or BS_AUTH, and integrity protection is provided by the digest authentication mechanism.

Plain HTTP Transport

In this non-limiting example, plain HTTP is used as a transport mechanism for the MN 12 and BSF 8 to exchange the password protected Diffie-Hellman parameters. Mutual authentication between the MN 12 and BSF 8 is based on the password protected Diffie-Hellman mechanism using MS_AUTH and BS_AUTH.

FIG. 7 illustrates one exemplary implementation of a bootstrapping mechanism negotiation with the chosen mechanism being CAVE, and where the bootstrapping procedure with CAVE requires three rounds of HTTP GET/response. The scenario for bootstrapping based on MN-AAA Key is very similar and therefore is not included here. The following describes the steps in more detail.

1. The MN 12 sends an HTTP GET request towards the BSF 8. The user's identity, in the form of "IMSI@realm.com", is included in the payload. In addition, the user includes the list of supported bootstrapping/authentication mechanism in the payload (e.g. {CAVE, B, C}, meaning that the MN 12 supports CAVE and two other mechanisms, B and C).
2. The BSF 8 retrieves the list of supported mechanisms from the payload and make a decision based on the list, the username (also from the payload), the user profile, and/or other information. Assume that the BSF 8 selects CAVE as the bootstrapping mechanism, and from this point on the bootstrapping is based on the chosen mechanism (e.g., CAVE). The BSF 8 generates a 32-bit RAND challenge value.
3. The BSF 8 sends a response (e.g. 200 OK) to the MN 12. The RAND is base64-encoded and carried in the payload. The payload also contains an indication that CAVE is the chosen mechanism.
4. The RAND challenge value received by the GBA Function is sent to the R-UIM or the 1X terminal as a simulated Global Challenge.
5. The 1X terminal (or the R-UIM) responds to the global challenge with an AUTHR and the SMEKEY. The AUTHR and the SMEKEY are then delivered to the GBA Function.
6. The GBA Function sets MS_PW to be the SMEKEY. It also generates a secret random number "x" for the Diffie-Hellman method.
7. The MN 12 sends another HTTP GET request to the BSF 8. The HTTP payload contains the AUTHR and the MS_RESULT, i.e., $g^x$ mod p covered by the hash of the SMEKEY.
8. The BSF 8 verifies that the received MS_RESULT is not zero. The BSF 8, acting as a VLR, sends an AUTHREQ to the HLR/AC 4'. The AUTHREQ includes the RAND, SYSACCTYPE=GAA access and AUTHR parameters. The ESN parameter is set to all zeros. The SYSCAP parameter is set to indicate that Authentication parameters were requested on this system access (bit-A=1) and that Signaling Message Encryption is supported by the system (bit-B=1). All other bits of the SYSCAP parameter can be set to zero.
9. The HLR/AC verifies the AUTHR and generates the SMEKEY.
10. The HLR/AC responds with a TIA-41 AUTHREQ that includes the SMEKEY parameter. If authentication fails, the AUTHREQ may include only an access deny indication.
11. The BSF 8 sets BS_PW=SMEKEY and generates a random secret number "y" for the Diffie-Hellman method.
12. The BSF 8 generates the 128-bit Ks. The B-TID value can also be generated in the format of NAI by taking the base64 encoded RAND value from step 2, and the BSF 8 server name, i.e. base64encode(RAND)@BSF_servers_domain_name.
13. The BSF 8 sends a response (e.g. 200 OK) to the MN 12. The payload of the response can contain the BS_RESULT, i.e. $g^y$ mod p, covered by the hash of SMEKEY, the B-TID, the lifetime of the key Ks, an indication of the chosen mechanism (CAVE) and BS_AUTH. Note that integrity protection can be provided by including the data in the computation of BS_AUTH. One exemplary way is as follows:

BS_AUTH[data]=SHA-1(0x00000005|0x00000C80+sizeof(data)|BS_PARAM|data|BS_PARAM|data) modulo $2^{128}$, where data is the information that needs to be integrity protected, and includes the B-TID, lifetime, and the indication of the chosen mechanism (CAVE).

14. The MN 12 verifies that the BS_AUTH equals the XBS_AUTH (same calculation as BS_AUTH). The MN 12 also verifies that the indicated chosen mechanism is CAVE. If successful, the server and the message sent are authenticated. If not successful, the MN 12 preferably aborts the bootstrapping procedure and may retry immediately or at a later time.
15. The MN 12 generates the 128-bit Ks.
16. The MN 12 sends another HTTP GET request to the BSF 8. The payload contains MS_AUTH. The payload may also contain the original list of supported mechanisms ({CAVE, B, C} in this example) and MS_AUTH. Integrity protection can be provided by including the data that needs to be protected in the computation of MS_AUTH. One exemplary way is as follows:

MS_AUTH[data]=SHA-1(0x00000004|0x00000C80+ sizeof(data)|MS_PARAM|data|MS_PARAM|data) modulo $2^{128}$, where data is the information that needs to be integrity protected, and the original list of supported mechanisms ({CAVE, B, C}).

17. The BS authenticates the MN 12 by verifying that the MS_AUTH equals XMS_AUTH (same calculation as MS_AUTH). The BS also verifies that the list of supported mechanisms is the same as the list received in step 2. If not, the BSF 8 may send a HTTP 403 Forbidden response, or other error responses to the MN 12, or it may silently abort the bootstrapping procedure (not shown).

18. The BSF 8 sends response (e.g. 200 OK) to the MN 12.

Note that there may be many possible variations in the above procedure. However, the basic concepts disclosed in accordance with the non-limiting and exemplary embodiments disclosed in U.S. patent application Ser. No. 11/232, 494 remain the same.

XML Schema Definition

In 3GPP GBA, an HTTP payload carries the B-TID (Bootstrapping Transaction Identifier) and the key lifetime in the final 200 OK response if bootstrapping is successful. The associated XML schema is defined in Annex C of 3GPP TS 24.109. 3GPP2 extends this schema to allow the payload to carry other information needed for bootstrapping based on SMEKEY and MN-AAA Key, these include the parameter AUTHR (for CAVE) and the password-protected Diffie-Hellman parameters. The non-limiting embodiments disclosed in U.S. patent application Ser. No. 11/232,494 provide for the XML schema be further extended to include the list of authentication mechanisms, as well as the indication of the selected mechanism. One possible definition of the schema is as follows, where the extensions used to support the non-limiting and exemplary embodiments disclosed in U.S. patent application Ser. No. 11/232,494 are shown underlined and in italics.

In the schema, the element "auth_list" is used to carry the list 11 of authentication and bootstrapping mechanisms in messages 1 and 5 in FIGS. 2 and 3. The element "auth" is used to carry an indication of the BSF-selected mechanism in messages 3 and 7 in FIGS. 2 and 3. The type "authType" is defined to be an enumeration of the current authentication and bootstrapping mechanisms in the various standards, and may take the following exemplary values:

"3GPP-AKA": bootstrapping based on 3GPP AKA mechanism;

"3GPP2-AKA": bootstrapping based on 3GPP2 AKA mechanism;

"CAVE": bootstrapping based on SMEKEY (CAVE); and

"MN-AAA": bootstrapping based on MN-AAA Key.

When more authentication mechanisms are supported in GBA, corresponding names of the new authentication mechanisms are added to authType.

Alternatively, instead of having both "3GPP-AKA" and "3GPP2-AKA", only "AKA" may be defined in the schema. The actual mechanism used in AKA is then preconfigured by the network operator.

Note that the above schema is exemplary in nature, and other techniques are possible to achieve the same goal. In addition, the schema may be extended to include other information that is useful to be carried in the payloads. For example, in the exemplary implementation using plain HTTP as transport for carrying the password protected Diffie-Hellman described above, the payloads preferably carry other information such as the username, RAND, MS_AUTH, BS_AUTH, and so on. The schema thus can be extended accordingly to allow these parameters to be carried as well.

It should be noted that the names of the authentication mechanisms in the above definition are exemplary, and are used herein without a loss of generality.

It should be appreciated that the exemplary embodiments described in FIGS. 1-7 are simple, efficient and secure, do not

```
<?xml version="1.0" encoding="UTF-8"?>
<xs:schema targetNamespace="uri:3gpp2-gba"
    xmlns:gba="uri:3gpp2-gba"
    xmlns:xs="http://www.w3.org/2001/XMLSchema">
    <!-- definition of the root element containing B-TID, key lifetime, and other
    parameters -->
<xs:complexType name="bootstrappingInfoType">
    <xs:sequence>
        <xs:element name="btid" type="xs:string" minOccurs="0"/>
        <xs:element name="lifetime" type="xs:dateTime" minOccurs="0"/>
        <xs:element name="authr" type="xs:base64Binary" minOccurs="0"/>
        <xs:element name="ms_result" type="xs:base64Binary" minOccurs="0"/>
        <xs:element name="bs_result" type="xs:base64Binary" minOccurs="0"/>
        <xs:element name="auth_list" minOccurs="0">
            <xs:simpleType>
                <xs:list itemType="gba:authType"/>
            </xs:simpleType>
        </xs:element>
        <xs:element name="auth" type="gba:authType" minOccurs="0"/>
    </xs:sequence>
</xs:complexType>
<!-- definition of authentication and bootstrapping mechanism type -->
<xs:simpleType name="authType">
    <xs:restriction base="xs:string">
        <xs:enumeration value="3GPP-AKA"/>
        <xs:enumeration value="3GPP2-AKA"/>
        <xs:enumeration value="CAVE"/>
        <xs:enumeration value="MN-AAA"/>
    </xs:restriction>
</xs:simpleType>
<!-- the root element -->
<xs:element name="BootstrappingInfo" type="gba:bootstrappingInfoType"/>
</xs:schema>
``` require standardization efforts in IETF, are extendable to support future authentication and bootstrapping mechanisms, and support both 3GPP and 3GPP2 systems.

In accordance with an apparatus, method and computer program product, in accordance with the non-limiting and exemplary embodiments disclosed in U.S. patent application Ser. No. 11/232,494, there is provided a technique for execution by a network device or node, such as the BSF 8, and a device or node, such as the MN 12, to execute a bootstrapping procedure comprising, in an initial bootstrapping request, the MN 12 sending the BSF 8 a first request message that includes a list of authentication mechanisms that the MN 12 supports; the BSF 8 determining an authentication mechanism to be used for bootstrapping, based at least on the list received from the MN 12, and proceeding with the selected authentication mechanism and including in a response message to the MN 12 an indication of the determined authentication mechanism; the MN 12 sending a second request message, which is at least partially integrity protected, to the BSF 8 based on the determined authentication mechanism, the second request message including the list of authentication mechanisms that the MN 12 supports in an integrity protected form. If authentication is successful, and if the list received in the second request message matches the list received in the first request message, the network may respond to the MN 12 with a successful response message, which is at least partially integrity protected, where the successful response message includes an indication of the selected authentication mechanism in an integrity protected form. The MN 12, upon receiving the successful response message, may verify that the authentication mechanism used by the MN 12 matches the authentication mechanism selected by the BSF 8. The first request message sent by the MN 12 may also comprise the user's identity, which may be used by the BSF 8 to aid in selecting the authentication mechanism.

Multiple message rounds may be accommodated by the teachings in accordance with the invention. Negotiation may proceed by Digest authentication, or it may proceed using HTTP, as non-limiting examples.

Having thus described the exemplary and non-limiting embodiments of the invention disclosed in U.S. patent application Ser. No. 11/232,494, a description is now provided of the exemplary and non-limiting embodiments of the invention in accordance with this invention. It can be noted that the exemplary embodiments of this invention can be used in conjunction with all or some of the various exemplary embodiments of the invention described in U.S. patent application Ser. No. 11/232,494

In accordance with the exemplary embodiments of this invention, the XML Schema is modified in such a way that it clearly identifies the 'binding' between the supported authentication mechanism and the identity or identities (ids) which can be used with that specific mechanism. If one identity can be used with multiple mechanisms, then the XML Schema preferably lists all possible combinations, e.g.:

| mechanism1 | id1 |
| mechanism1 | id2 |
| mechanism2 | id3 |

Figure 8:
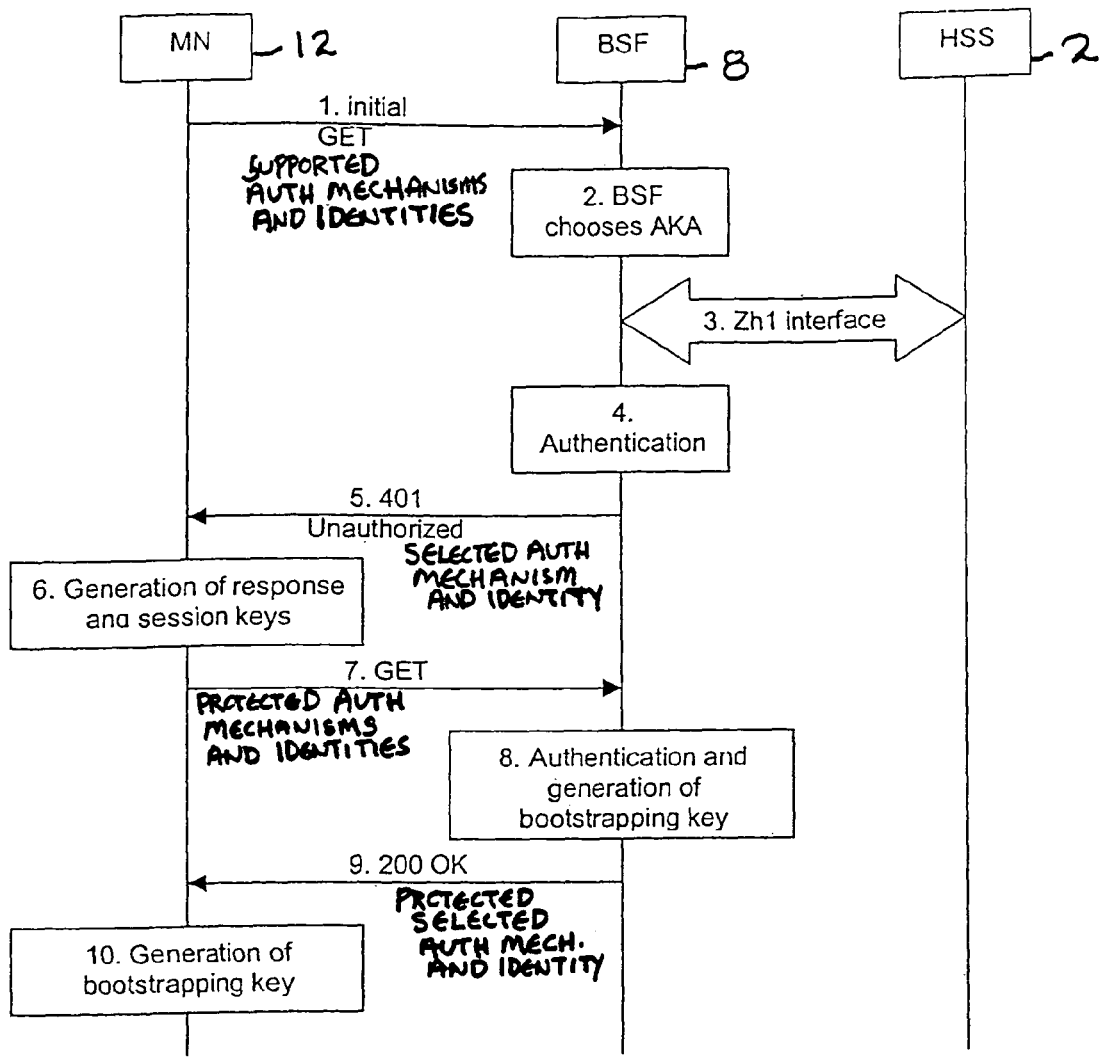
FIG. 8 illustrates a bootstrapping procedure with an authentication mechanism selection in accordance with the exemplary embodiments of this invention, and is adapted from FIG. C.3-1: Bootstrapping signaling based on AKA found in Annex C of 3GPP2 S.P0109-0, Version 0.6, 8 Dec. 2005, "Generic Bootstrapping Architecture (GBA) Framework", appended as Exhibit C to the above referenced U.S. Provisional Patent Application No. 60/759,487.

Referring now to FIG. 8, once the first HTTP GET message with the XML document (based on the XML Schema) as payload is received by the BSF 8 (message 1 in FIG. 8), the BSF 8 selects the mechanism preferred by the network and contacts the appropriate database to proceed with the bootstrapping procedure. If the selected mechanism happens to be usable with more than one identity (as listed by the MN 12 in the XML document in the HTTP payload), then the BSF 8 selects one of the identities. Once the selection is performed the XML document returned to the MN 12 by the BSF in the 401 Response (message 5 in FIG. 8) to the GET request explicitly identifies the selected mechanism and the corresponding associated identity.

It can be noted that the XML Schema defines how an XML document will appear. The XML document is then sent in the payload of the HTTP messages. Thus, the XML Schema may be considered to be fixed, and is not sent during bootstrapping. However, XML documents conforming to this XML Schema are sent as HTTP payload, to convey the information needed for bootstrapping.

In accordance with the foregoing, the identities to be inserted into the messages of the bootstrapping procedure are as follows:

A. HTTP GET Request from MN 12 to BSF 8 (Message 1 in FIG. 8)

The Authorization header in the HTTP GET request may contain any of the MN 12 identities. The BSF 8 does not rely on this identity at this time. Preferably the XML document in the HTTP payload contains the list of supported mechanisms and MN 12 identities as described above.

B. HTTP 401 UNAUTHORIZED Response from the BSF 8 to the MN 12 (Message 5 in FIG. 8)

The BSF 8 selects one authentication mechanism and one corresponding identity from the list found in the XML document in the HTTP payload received from the MN 12. The selected authentication mechanism and corresponding identity are returned to the MN 12 in the payload of the response message.

C. HTTP GET Request from the MN 12 to the BSF 8 (Message 7 in FIG. 8)

The MN 12 uses its identity returned by the BSF 8 in the payload of the previous message as the user identity in the HTTP digest authentication (authorization header field). The MN 12 and the BSF 8 then proceed according to the authentication mechanism selected by the BSF 8. Preferably the XML document in the HTTP payload contains the supported mechanisms and MN 12 identities as described above. Unlike message 1, this information is integrity protected.

D. HTTP 200 OK Response from the BSF 8 to the MN 12 (Message 9 in FIG. 8)

The BSF 8 responds with an HTTP 200 OK message, indicating a successful authentication and bootstrapping operation. The message also includes the digest response computed by the BSF. The message may also include an indication of the selected authentication mechanism and corresponding identity for reference by the MN 12. Similarly, this indication is integrity protected by setting qop to "auth-int".

The remainder of the bootstrapping procedure may then continue as described in 3GPP2 S.P0109-0, Version 0.6, 8 Dec. 2005, "Generic Bootstrapping Architecture (GBA) Framework", attached as Exhibit C to the above-referenced U.S. Provisional Patent Application No. 60/759,487. This document is expected to be published as 3GPP2 S.S0109-0, v1.0, and currently the most recent version is S00-20060220-121A_SP0109_V&V_changes.doc.

XML Schema Modification

The current XML Schema is as follows:

```
<?xml version="1.0" encoding="UTF-8"?>
<xs:schema targetNamespace="uri:3gpp2-gba"
    xmlns:gba="uri:3gpp2-gba"
    xmlns:xs="http://www.w3.org/2001/XMLSchema">
    <!-- definition of the root element containing B-TID, key lifetime, and other parameters
    -->
    <xs:complexType name="bootstrappingInfoType">
        <xs:sequence>
            <xs:element name="btid" type="xs:string" minOccurs="0"/>
            <xs:element name="lifetime" type="xs:dateTime" minOccurs="0"/>
            <xs:element name="esn" type="xs:base64Binary" minOccurs="0"/>
            <xs:element name="ms_chall" type="xs:base64Binary" minOccurs="0"/>
            <xs:element name="ms_result" type="xs:base64Binary" minOccurs="0"/>
            <xs:element name="bs_result" type="xs:base64Binary" minOccurs="0"/>
            <xs:element name="auth_list" minOccurs="0">
                <xs:simpleType>
                    <xs:list itemType="gba:authType"/>
                </xs:simpleType>
            </xs:element>
            <xs:element name="auth" type="gba:authType" minOccurs="0"/>
        </xs:sequence>
    </xs:complexType>
    <!-definition of authentication and bootstrapping mechanism type-->
    <xs:simpleType name="authType">
        <xs:restriction base="xs:string">
            <xs:enumeration value="AKA"/>
            <xs:enumeration value="CAVE"/>
            <xs:enumeration value="MN-AAA"/>
        </xs:restriction>
    </xs:simpleType>
    <!-- the root element -->
    <xs:element name="BootstrappingInfo" type="gba:bootstrappingInfoType"/>
</xs:schema>
```

35

There are several possible modifications that can be made to the foregoing XML Schema in order to implement the exemplary embodiments of this invention. What follows are several examples that are intended to be read as exemplary and not as a limitation upon the practice and/or use of the exemplary embodiments of this invention.

Example 1

```
<?xml version="1.0" encoding="UTF-8"?>
<xs:schema targetNamespace="uri:3gpp2-gba"
    xmlns:gba="uri:3gpp2-gba"
    xmlns:xs="http://www.w3.org/2001/XMLSchema">
    <!-- definition of the root element containing B-TID, key lifetime, and other parameters
    -->
    <xs:complexType name="bootstrappingInfoType">
        <xs:sequence>
            <xs:element name="btid" type="xs:string" minOccurs="0"/>
            <xs:element name="lifetime" type="xs:dateTime" minOccurs="0"/>
            <xs:element name="esn" type="xs:base64Binary" minOccurs="0"/>
            <xs:element name="ms_chall" type="xs:base64Binary" minOccurs="0"/>
            <xs:element name="ms_result" type="xs:base64Binary" minOccurs="0"/>
            <xs:element name="bs_result" type="xs:base64Binary" minOccurs="0"/>
            <xs:element name="auth_list" minOccurs="0">
                <xs:complexType>
                    <xs:sequence>
                        <xs:element name="auth_info" type="gba:authInfo" minOccurs="1"/>
                    </xs:sequence>
                </xs:complexType>
            </xs:element>
            <xs:element name="auth" type="gba:authInfo" minOccurs="0"/>
        </xs:sequence>
    </xs:complexType>
    <xs:complexType name="authInfo">
        <xs:sequence>
```

```
            <xs:element name="method" type="gba:authType"/>
            <xs:element name="clientid" type="xs:string"/>
        </xs:sequence>
    </xs:complexType>
    <!--definition of authentication and bootstrapping mechanism type-->
    <xs:simpleType name="authType">
        <xs:restriction base="xs:string">
            <xs:enumeration value="AKA"/>
            <xs:enumeration value="CAVE"/>
            <xs:enumeration value="MN-AAA"/>
        </xs:restriction>
    </xs:simpleType>
    <!-- the root element -->
    <xs:element name="BootstrappingInfo" type="gba:bootstrappingInfoType"/>
</xs:schema>
```

What follows is a "snippet" of an example of "auth_list" according to the foregoing XML Schema:

```
<auth_list>
    <auth_info>
        <method> AKA </method>
        <clientid> user1_private@home1.net </clientid>
    </auth_info>
    <auth_info>
        <method> CAVE </method>
        <clientid> 123456789012345 </clientid>
    </auth_info>
    <auth_info>
        <method> MN-AAA </method>
        <clientid> foo@example.com </clientid>
    </auth_info>
</auth_list>
```

Example 2

XML Schema 2:

```
<?xml version="1.0" encoding="UTF-8"?>
<xs:schema targetNamespace="uri:3gpp2-gba"
    xmlns:gba="uri:3gpp2-gba"
    xmlns:xs="http://www.w3.org/2001/XMLSchema">
    <!-- definition of the root element containing B-TID, key lifetime, and other parameters
    -->
    <xs:complexType name="bootstrappingInfoType">
        <xs:sequence>
            <xs:element name="btid" type="xs:string" minOccurs="0"/>
            <xs:element name="lifetime" type="xs:dateTime" minOccurs="0"/>
            <xs:element name="esn" type="xs:base64Binary" minOccurs="0"/>
            <xs:element name="ms_chall" type="xs:base64Binary" minOccurs="0"/>
            <xs:element name="ms_result" type="xs:base64Binary" minOccurs="0"/>
            <xs:element name="bs_result" type="xs:base64Binary" minOccurs="0"/>
            <xs:element name="auth_list" minOccurs="0">
                <xs:complexType>
                    <xs:sequence>
                        <xs:element name="auth_info" type="gba:authInfo" minOccurs="1"/>
                    </xs:sequence>
                </xs:complexType>
            </xs:element>
            <xs:element name="auth" type="gba:authInfo" minOccurs="0"/>
        </xs:sequence>
    </xs:complexType>
    <xs:complexType name="authInfo">
        <xs:simpleContent>
            <xs:extension base="gba:authType">
                <xs:attribute name="clientid" type="xs:string" use="required"/>
            </xs:extension>
        </xs:simpleContent>
    </xs:complexType>
    <!--definition of authentication and bootstrapping mechanism type-->
    <xs:simpleType name="authType">
        <xs:restriction base="xs:string">
            <xs:enumeration value="AKA"/>
            <xs:enumeration value="CAVE"/>
            <xs:enumeration value="MN-AAA"/>
        </xs:restriction>
    </xs:simpleType>
    <!-- the root element -->
```

```
<xs:element name="BootstrappingInfo" type="gba:bootstrappingInfoType"/>
</xs:schema>
```

Below is a snippet of an example of "auth_list" according to this XML Schema:

```
<auth_list>
    <auth_info clientid = "user1_private@home1.net">
    AKA </auth_info>
    <auth_info clientid = "123456789012345"> CAVE </auth_info>
    <auth_info clientid = "foo@example.com "> MN-AAA
    </auth_info>
</auth_list>
```

Example 3

XML Schema 3:

```
<?xml version="1.0" encoding="UTF-8"?>
<xs:schema targetNamespace="uri:3gpp2-gba"
    xmlns:gba="uri:3gpp2-gba"
    xmlns:xs="http://www.w3.org/2001/XMLSchema">
    <!-- definition of the root element containing B-TID, key lifetime, and other parameters
    -->
    <xs:complexType name="bootstrappingInfoType">
        <xs:sequence>
            <xs:element name="btid" type="xs:string" minOccurs="0"/>
            <xs:element name="lifetime" type="xs:dateTime" minOccurs="0"/>
            <xs:element name="esn" type="xs:base64Binary" minOccurs="0"/>
            <xs:element   name="ms_chall"   type="xs:base64Binary"
            minOccurs="0"/>
            <xs:element   name="ms_result"   type="xs:base64Binary"
            minOccurs="0"/>
            <xs:element   name="bs_result"   type="xs:base64Binary"
            minOccurs="0"/>
            <xs:element name="auth_list" minOccurs="0">
                <xs:simpleType>
                    <xs:list itemType="gba:authType"/>
                </xs:simpleType>
            </xs:element>
            <xs:element name="auth" type="gba:authType" minOccurs="0"/>
            <xs:element name="clientid_list" minOccurs="0">
                <xs:simpleType>
                    <xs:list itemType="xs:string "/>
                </xs:simpleType>
            </xs:element>
            <xs:element name="clientid" type="xs:string" minOccurs="0"/>
        </xs:sequence>
    </xs:complexType>
    <!--definition of authentication and bootstrapping mechanism type-->
    <xs:simpleType name="authType">
        <xs:restriction base="xs:string">
            <xs:enumeration value="AKA"/>
            <xs:enumeration value="CAVE"/>
            <xs:enumeration value="MN-AAA"/>
        </xs:restriction>
    </xs:simpleType>
    <!-- the root element -->
    <xs:element name="BootstrappingInfo" type="gba:bootstrappingInfoType"/>
</xs:schema>
```

What follows is a snippet of an example of "auth_list" and "clientid_list":

```
<auth_list>AKA CAVE MN-AAA</auth_list>
<clientid_list>user1_private@home1.net 123456789012345
    foo@example.com </clientid_list>
```

FIG. 8 shows an example call flow using the XML Schema 1 above. The example is taken from FIG. C.3-1 of Annex C of 3GPP2 S.P0109-0, Version 0.6, 8 Dec. 2005, "Generic Bootstrapping Architecture (GBA) Framework", attached as Exhibit C to the above-referenced U.S. Provisional Patent Application No. 60/759,487. The example of FIG. 8 highlights the changes made in the HTTP payload, and therefore only messages 1, 5, 7 and 9 are of particular relevance to gaining an understanding of the exemplary embodiments of this invention. The remainder of the diagram can remain unchanged from that shown in Annex C.

Message 1. Initial GET Request (MN 12 to BSF 8)

The purpose of this message is to initiate the bootstrapping procedure between the MN 12 and the BSF 8. The MN 12 sends an HTTP Request containing the private user identity towards its home BSF 8. The MN 12 also presents a list of bootstrapping mechanisms that it supports, together with the corresponding identities, in the payload of the message.

TABLE

Example of initial GET request (MN 12 to BSF 8)

GET / HTTP/1.1
Host: bsf.home.net
User-Agent: Bootstrapping Client Agent
Date:
Accept: */*
Referer: http://pki-portal.home1.net:2311/pkip/enroll
Authorization: Digest username="user1_private@home.net",
realm="bsf.home.net", nonce="", uri="/", response=""
Content-Type: application/vnd.3gpp2.bsf+xml
Content-Length: (...)
<?xml version="1.0" encoding="UTF-8"?>
<BootstrappingInfo xmlns="uri:3gpp2-gba">
    <auth_list>
        <auth_info>
            <method> AKA </method>
            <clientid> user1_private@home1.net </clientid>
        </auth_info>
        <auth_info>
            <method> CAVE </method>
            <clientid> 123456789012345 </clientid>
        </auth_info>
        <auth_info>
            <method> MN-AAA </method>
            <clientid> foo@example.com </clientid>
        </auth_info>
    </auth_list>
</BootstrappingInfo>

Message 5. 401 Unauthorized Response (BSF 8 to MN 12)

The BSF 8 forwards the challenge to the MN 8 in the HTTP 401 Unauthorized response (without the CK, IK and XRES). This is to demand the MN 12 to authenticate itself. The challenge contains RAND and AUTN that are populated in nonce field according to RFC 3310 (IETF RFC 3310 "Digest AKA", attached as Exhibit B to the above-referenced U.S. Provisional Patent Application No. 60/759,487).

TABLE

Example of 401 Unauthorized response (BSF 8 to MN 12)

HTTP/1.1 401 Unauthorized
Server: Bootstrapping Server
Date: Mon, 24 Oct 2005 10:13:17 GMT
WWW-Authenticate: Digest realm="bsf.home.net", nonce=
base64(RAND + AUTN + server specific data),
algorithm=AKAv1-MD5, qop=auth-int
Content-Type: application/vnd.3gpp2.bsf+xml
Content-Length: (...)
<?xml version="1.0" encoding="UTF-8"?>
<BootstrappingInfo xmlns="uri:3gpp2-gba">
    <auth>
        <method> AKA </method>
        <clientid> user1_private@home1.net </clientid>
    </auth>
</BootstrappingInfo>

Message 7. Example of GET Request (MN 12 to BSF 8)

The MN 12 sends an HTTP GET request again, with the RES which is used for response calculation, to the BSF 8.

TABLE

Example of GET request (MN 12 to BSF 8)

GET / HTTP/1.1
Host: bsf.home.net
User-Agent: Bootstrapping Client Agent
Date: Mon, 24 Oct 2005 10:13:18 GMT
Accept: */*
Referer: http://pki-portal.home.net:2311/pkip/enroll
Authorization: Digest username="user1_private@home.net",
realm="bsf.home.net",
nonce=base64(RAND + AUTN + server specific data), uri="/",
qop=auth-int, nc=00000001,
cnonce="6629fae49393a05397450978507c4ef1",
response="6629fae49393a05397450978507c4ef1",
opaque="5ccc069c403ebaf9f0171e9517f30e41", algorithm=AKAv1-MD5
Content-Type: application/vnd.3gpp2.bsf+xml
Content-Length: (...)
<?xml version="1.0" encoding="UTF-8"?>
<BootstrappingInfo xmlns="uri:3gpp2-gba">
    <auth_list>
        <auth_info>
            <method> AKA </method>
            <clientid>     user1_private@home1.-
netuser1_private@home1.net
            </clientid>
        </auth_info>
        <auth_info>
            <method> CAVE </method>
            <clientid> 123456789012345 </clientid>
        </auth_info>
        <auth_info>
            <method> MN-AAA </method>
            <clientid> foo@example.com </clientid>
        </auth_info>
    </auth_list>
</BootstrappingInfo>

Message 9. Example 200 OK Response (BSF 8 to MN 12)

The BSF 8 sends 200 OK response to the MN 12 to indicate the success of the authentication.

TABLE

200 OK response (BSF 8 to MN 12)

HTTP/1.1 200 OK
Server: Bootstrapping Server
Authentication-Info:    qop=auth-int,
rspauth="6629fae49394a05397450978507c4ef1",
cnonce="6629fae49393a05397450978507c4ef1", nc=00000001
Date:
Expires: *date/time*
Content-Type: application/vnd.3gpp.bsf+xml
Content-Length: (...)
<?xml version="1.0" encoding="UTF-8"?>
<BootstrappingInfo xmlns="uri:3gpp-gba">
    <auth>
        <method> AKA </method>
        <clientid> user1_private@home1.net </clientid>
    </auth>
    <btid>bmFtYXJ0bHUgc2F5cyBoaQ==@bsf.operator.com</btid>
    <lifetime>2005-11-21T13:20:00-05:00</lifetime>
</BootstrappingInfo>

Based on the foregoing it should be apparent that the exemplary embodiments of this invention provide a method, apparatus and computer program product(s) to send a wireless network (WN) a first message that is comprised of a list of authentication mechanisms supported by a node and, in association with each authentication mechanism, a corresponding identification, and determining in the WN an authentication mechanism to be used for bootstrapping, based at least on the list received from the node, and including in a first response message to the node information pertaining to the determined authentication mechanism in conjunction with the corresponding identification.

It can be appreciated that an aspect of the exemplary embodiments of this invention is that in this invention, when an "authentication mechanism" is sent in the HTTP payload, there is also included the corresponding identification, also referred to herein without a loss of generality as an identity.

From this point of view, for the first and second requests from the MN 12, the list of supported mechanisms are included in the HTTP payload and, therefore, the corresponding identifications are included as well. Also, for the first and second responses sent by the WN, the selected authentication mechanism is included in the payload, and the corresponding identification is included as well. Further, the second request from the MN 12 also contains the list and the corresponding identifications, and this information is integrity protected. Similarly, the selected mechanism and the corresponding identification, if present in the second response, are preferably also integrity protected.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. As non-limiting examples, other types of message formats and the like may be used for conveying information between the device 12 and the wireless network element(s) 8, and/or other types of authentication mechanisms may be employed instead of, or in addition to, those specifically mentioned above. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
receiving from a mobile node by a bootstrapping server function of a wireless network a first message that is comprised of a list of authentication mechanisms supported by a mobile node and, in association with each authentication mechanism, a corresponding identity of a user;
determining by the bootstrapping server function an authentication mechanism to be used for bootstrapping, based at least on the list received from the mobile node;
sending a second message to the mobile node by the bootstrapping server function, the second message comprising the determined authentication mechanism in conjunction with a corresponding identity;
receiving by the bootstrapping server function from the mobile node a third message that is at least partially integrity protected based on the determined authentication mechanism, the third message comprising at least the list of authentication mechanisms that the mobile node supports, and corresponding identities, in an integrity protected form; and
if authentication is successful, and if the list received in the third message matches the list received in the first message, responding to the mobile node with a second response message that is at least partially integrity protected, where the second response message comprises an indication of the selected authentication mechanism, and corresponding identities, in an integrity protected form.

2. The method of claim 1, where if the determined authentication mechanism is usable with more than one identity, further comprising selecting one of the identities to be associated with the determined authentication mechanism.

3. The method of claim 1, where the first message comprises a HTTP GET request, and where the second message comprises a first response message that comprises a XML document that explicitly identifies the determined authentication mechanism and a corresponding identity.

4. The method of claim 1, further comprising verifying that the authentication mechanism used by the mobile node matches the authentication mechanism determined by the bootstrapping server function.

5. The method of claim 1, where the first message is an HTTP GET, where the list is included in an HTTP payload.

6. The method of claim 1, where the second message is an HTTP 401 Unauthorized response.

7. The method of claim 1, where the third message is an HTTP GET that comprises a computed response in accordance with the selected authentication mechanism.

8. The method of claim 1, where the second response message is an HTTP 200 OK message.

9. A non-transitory computer readable memory embodied with a computer program having computer code the execution of which by a data processor of a mobile node comprises operations of:
sending a bootstrapping server function of a wireless network a first message that is comprised of a list of authentication mechanisms supported by the mobile node and, in association with each authentication mechanism, a corresponding identity of a user;
receiving a first response message from the bootstrapping server function, the first response message comprising information pertaining to an authentication mechanism selected by the bootstrapping server function from the list provided by the mobile node in the first message in conjunction with a corresponding identity; sending a third message that is at least partially integrity protected based on the determined authentication mechanism to the bootstrapping server function, the third message comprising at least the list of authentication mechanisms that the mobile node supports, and corresponding identities, in an integrity protected form; and if authentication is successful, and if the list received in the third message matches the list received in the first message, receiving from the bootstrapping server function with a second response message that is at least partially integrity protected, where the second response message may comprise an indication of the selected authentication mechanism, and corresponding identities, in an integrity protected form.

10. The non-transitory computer readable memory of claim 9, where the first message is sent as an HTTP GET, where the list is included in an HTTP payload, and where the first response message is received as an HTTP 401 Unauthorized response.

11. The non-transitory computer readable memory of claim 9, where the second message is sent as an HTTP GET that comprises a computed response in accordance with the selected authentication mechanism.

12. The non-transitory computer readable memory of claim 9, where the second response message is received as an HTTP 200 OK message.

13. The non-transitory computer readable memory of claim 9, further comprising verifying that the authentication mechanism used by the mobile node matches the authentication mechanism selected by the bootstrapping server function.

14. A device, comprising:
a data processor;
a transmitter; and
a receiver, the device configured to send to a bootstrapping server function of a network via the transmitter a first message that is comprised of a list of authentication mechanisms supported by the device and, in association with each authentication mechanism, a corresponding identity of a user and to receive from the bootstrapping server function via the receiver a first response message, the first response message comprising information pertaining to an authentication mechanism selected by the bootstrapping server function from the list in conjunction with a corresponding identity, wherein the device comprises a mobile node, wherein the device is further configured:
to send via the transmitter a second message to the bootstrapping server function that is at least partially integrity protected, the second message comprising at least the list of authentication mechanisms, and the corresponding identities, that the device supports in an integrity protected form; and
if authentication is successful, and if the list received in the second message matches the list received in the first message, to receive via the receiver a second response message from the bootstrapping server function that is at least partially integrity protected, where the second response message comprises an indication of the selected authentication mechanism, and the corresponding identity, in an integrity protected form.

15. The device of claim 14, where the first message is sent as an HTTP GET, where the list is included in an HTTP payload, and where the first response message is received as an HTTP 401 Unauthorized response.

16. The device of claim 14, where the second message is sent as an HTTP GET that comprises a computed response in accordance with the selected authentication mechanism.

17. The device of claim 14, where the second response message is received as an HTTP 200 OK message.

18. The device of claim 14, where said data processor is further configured to verify that an authentication mechanism used by the device matches the authentication mechanism selected by the bootstrapping server function.

19. A non-transitory computer readable memory embodied with a computer program having computer code the execution of which by a data processor of a bootstrapping server function of a wireless network element comprises operations of:
receiving a first message from a mobile node that is comprised of a list of authentication mechanisms supported by the mobile node and, in association with each authentication mechanism, a corresponding identity of a user;
determining an authentication mechanism to be used for bootstrapping, based at least on the list received from the mobile node;
sending a first response message to the mobile node, the first response message comprising information pertaining to the determined authentication mechanism and a corresponding identity;
receiving a second message from the mobile node that is at least partially integrity protected, the second message comprising at least the list of authentication mechanisms that the mobile node supports, and the corresponding identities, in an integrity protected form; and
if authentication is successful, and if the list received in the second message matches the list received in the first message, further comprising an operation of sending a second response message to the mobile node that is at least partially integrity protected, where the second response message comprises an indication of the selected authentication mechanism, and the corresponding identity, in an integrity protected form.

20. The non-transitory computer readable memory of claim 19, further comprising retrieving a profile based on the identity, and where the determining operation considers the profile.

21. The non-transitory computer readable memory of claim 19, where the first message is received as an HTTP GET that comprises an identity of the user of the mobile node, where the list is included in an HTTP payload.

22. The non-transitory computer readable memory of claim 19, where the first response message is sent as an HTTP 401 Unauthorized response.

23. The non-transitory computer readable memory of claim 19, where the second message is received as an HTTP GET that comprises a computed response in accordance with the determined authentication mechanism.

24. The non-transitory computer readable memory of claim 19, where the second response message is sent as an HTTP 200 OK message.

25. A network device, comprising:
a data processor;
a transmitter; and
a receiver,
the network device configured to receive from a mobile node, via the receiver, a first message that is comprised of a list of authentication mechanisms supported by the mobile node and, in association with each authentication mechanism, a corresponding identity of a user;
determine an authentication mechanism to be used for bootstrapping, based at least in part on the list received from the mobile node;
send a first response message to the mobile node via the transmitter, the first response message comprising information pertaining to the determined authentication mechanism and a corresponding identity;

receive from the mobile node a second message that is at least partially integrity protected, the second message comprising the list of authentication mechanisms that the mobile node supports, and corresponding identities, in an integrity protected form; and if authentication is successful, and if the list received in the second message matches the list received in the first message, to send a second response message to the mobile node that is at least partially integrity protected, where the second response message comprises an indication of the selected authentication mechanism, and the corresponding identity, in an integrity protected form, wherein the network device comprises a bootstrapping server function.

26. The network device of claim 25, further configured to retrieve a profile based on the identity for consideration when determining the authentication mechanism to be used for bootstrapping.

27. The network device of claim 25, where the first message is received as an HTTP GET that comprises an identity of the user of the mobile node, where the list is included in an HTTP payload.

28. The network device of claim 25, where the first response message is sent as an HTTP 401 Unauthorized response.

29. The network of claim 25, where the second message is received as an HTTP GET that comprises a computed response in accordance with the determined authentication mechanism.

30. The network device of claim 25, where the second response message is sent as an HTTP 200 OK message.

31. A device, comprising:
a transmitter configured to send to a bootstrapping server function of a network a first message that is comprised of a list of authentication mechanisms supported by the device and, in association with each authentication mechanism, a corresponding identity of a user, the transmitter is further configured to send a second message to the bootstrapping server function that is at least partially integrity protected, the second message comprising at least the list of authentication mechanisms, and the corresponding identities, that the device supports in an integrity protected form;

a receiver configured to receive from the bootstrapping server function a first response message, the first response message comprising information descriptive of an authentication mechanism selected by the bootstrapping server function from the list and a corresponding identity;

a processor; and
a memory embodied with software;
wherein the processor, in conjunction with the memory and the software, is configured to cause the device to integrity protect the list of authentication mechanisms supported by the device that is sent in the at least partially integrity protected second message to the bootstrapping server function and further configured to verify that the authentication mechanism used by the device matches the authentication mechanism selected by the bootstrapping server function, wherein the device comprises a mobile node, and
if authentication is successful, and if the list received in the second message matches the list received in the first message, the receiver is further configured to receive a second response message from the bootstrapping server function that is at least partially integrity protected, where the second response message comprises an indication of the selected authentication mechanism, and the corresponding identity, in an integrity protected form.

32. A network device, comprising:
a receiver configured to receive from a mobile node a first message that is comprised of a list of authentication mechanisms supported by the mobile node and, in association with each authentication mechanism, a corresponding identity of a user, a processor:
a memory embodied with software,
the processor, in conjunction with the memory and the software, configured to cause the network device to select an authentication mechanism to be used for bootstrapping, based at least in part on the list received from the mobile node, and send a first response message to the mobile node, the first response message comprising information pertaining to the selected authentication mechanism and a corresponding identity, said receiver further configured to receive from the mobile node a second message that is at least partially integrity protected, the second message comprising the list of authentication mechanisms that the mobile node supports and, in association with each authentication mechanism, the corresponding identity, wherein the device comprises a mobile node and the network device comprises a bootstrapping server function, where said network device is responsive to successful authentication, and to the list received in the second message matching the list received in the first message, for sending to the mobile node a second response message that is at least partially integrity protected, where the second response message comprises in an integrity protected form, an indication of the selected authentication mechanism and the corresponding identity.

33. The network device of claim 32, the network device further configured to retrieve a profile based on the identity for use by said network device when selecting the authentication mechanism to be used for bootstrapping.

34. A system, comprising a device coupled to a network device, said device comprising a data processor coupled to a transmitter and to a receiver and operable to send to the network device via the transmitter a first message that is comprised of a list of authentication mechanisms supported by the device and, in association with each authentication mechanism, a corresponding identity of a user, said network device comprising a data processor coupled to a transmitter and to a receiver and operable to select an authentication mechanism from the list, said device receiving from the network device via the receiver a first response message, the first response message comprising information pertaining to the authentication mechanism selected by the network device from the list and a corresponding identity, said device data processor operable to at least partially integrity protect at least the list of authentication mechanisms supported by the device, and the corresponding identities, and to send via the transmitter a second message to the network device, the second message comprising the list of authentication mechanisms and corresponding identities, wherein the device comprises a mobile node and the network device comprises a bootstrapping server function, where, if authentication is successful, and if the list received in the second message matches the list received in the first message, said data processor further receives a second response message from the network device that is at least partially integrity protected, where the second response message comprises an indication of the authentication mechanism selected by the network device in an integrity protected form, and the corresponding identity.

35. The system of claim 34, where the device is coupled to the network device through a wireless link.

36. A method, comprising:

sending by a mobile node to a bootstrapping server function of a network a first message that is comprised of a list of authentication mechanisms supported by a device and, in association with each authentication mechanism, a corresponding identity of a user; and receiving by the mobile node from the bootstrapping server function a first response message, the first response message comprising information pertaining to an authentication mechanism selected by the bootstrapping server function from the list in conjunction with a corresponding identity;

integrity protecting at least the list of authentication mechanisms supported by the device and the corresponding identities;

sending a second message to the bootstrapping server function, the second message comprising at least the list of authentication mechanisms and the corresponding identities; and if authentication is successful, and if the list received in the second message matches the list received in the first message, receiving a second response message from the bootstrapping server function that is at least partially integrity protected, where the second response message comprises an indication of the selected authentication mechanism, and the corresponding identity, wherein the device comprises a mobile node.

37. The method of claim 36, where the first message is sent as an HTTP GET, where the list is included in an HTTP payload, and where the first response message is received as an HTTP 401 Unauthorized response.

38. The method of claim 36, where the second message is sent as an HTTP GET that comprises a computed response in accordance with the selected authentication mechanism.

39. The method of claim 36, where the second response message is received as an HTTP 200 OK message.

40. The method of claim 36, further comprising verifying that an authentication mechanism used by the device matches the authentication mechanism selected by the bootstrapping server function.

\* \* \* \* \*